US012671452B2

(12) United States Patent
Forrester et al.

(10) Patent No.: US 12,671,452 B2
(45) Date of Patent: Jun. 30, 2026

(54) SENSING CIRCUITRY FOR RADIO FREQUENCY EXPOSURE COMPLIANCE

(71) Applicant: QUALCOMM Incorporated, San Diego, CA (US)

(72) Inventors: John Forrester, San Diego, CA (US); Udara Fernando, San Diego, CA (US); Farhad Meshkati, San Diego, CA (US); Lin Lu, San Diego, CA (US); Jagadish Nadakuduti, Bermuda Dunes, CA (US); Scott Hoover, Del Mar, CA (US); Roberto Rimini, San Diego, CA (US); Justin McGloin, Los Altos, CA (US); Arvind Vardarajan Santhanam, San Diego, CA (US); Michael Lee McCloud, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 18/470,851

(22) Filed: Sep. 20, 2023

(65) Prior Publication Data

US 2024/0106482 A1 Mar. 28, 2024

Related U.S. Application Data

(60) Provisional application No. 63/376,532, filed on Sep. 21, 2022.

(51) Int. Cl.
H04W 52/18 (2009.01)
H04B 1/3827 (2015.01)

(52) U.S. Cl.
CPC .......... H04B 1/3838 (2013.01); H04W 52/18 (2013.01)

(58) Field of Classification Search
CPC ............................. H04B 1/3837; H04W 52/18
See application file for complete search history.

(56) References Cited

U.S. PATENT DOCUMENTS

| | | | | |
|---|---|---|---|---|
| 9,794,892 | B2 * | 10/2017 | Lee ........................ | H04W 4/025 |
| 10,897,318 | B2 * | 1/2021 | Rimini ................. | H04B 17/102 |
| 11,533,114 | B2 * | 12/2022 | Rimini ................. | H04B 1/3827 |
| 11,848,714 | B2 * | 12/2023 | Rimini ................. | H04B 17/102 |
| 11,917,559 | B2 * | 2/2024 | Nadakuduti ........ | H04W 52/367 |
| 12,143,938 | B2 * | 11/2024 | Lu ......................... | H04W 52/225 |
| 12,282,083 | B2 * | 4/2025 | Va ........................... | G01S 7/006 |

(Continued)

OTHER PUBLICATIONS

International Search Report and Written Opinion—PCT/US2023/ 074754—ISA/EPO—Jan. 26, 2024.

*Primary Examiner* — Hai V Nguyen
(74) *Attorney, Agent, or Firm* — Patterson & Sheridan LLP/Qualcomm

(57) ABSTRACT

Certain aspects of the present disclosure provide techniques for operating a wireless device pursuant to radio frequency (RF) exposure compliance. A method that may be performed by a wireless device includes switching sensing circuitry to a first mode in response to one or more first criteria being satisfied; switching the sensing circuitry to a second mode in response to one or more second criteria being satisfied; and transmitting a signal at a transmit power determined based at least in part on a radio frequency (RF) exposure limit, and if the sensing circuitry is operating in the second mode, on one or more measurements associated with the sensing circuitry.

30 Claims, 11 Drawing Sheets

(56) References Cited

U.S. PATENT DOCUMENTS

| | | | |
|---|---|---|---|
| 12,317,327 B2* | 5/2025 | MolavianJazi ... | H04W 74/0833 |
| 12,323,961 B2* | 6/2025 | Nadakuduti ......... | H04W 72/56 |
| 2017/0273033 A1* | 9/2017 | Lee .................... | H04W 52/283 |
| 2020/0336222 A1* | 10/2020 | Rimini .................... | H04B 1/04 |
| 2022/0116949 A1* | 4/2022 | Nadakuduti ...... | H04W 72/0473 |
| 2022/0159581 A1* | 5/2022 | Lu ....................... | H04W 52/225 |
| 2022/0159582 A1* | 5/2022 | Lu ....................... | H04W 52/225 |
| 2022/0377799 A1* | 11/2022 | MolavianJazi ... | H04W 74/0833 |
| 2022/0413116 A1* | 12/2022 | Va ........................... | G01S 13/52 |
| 2024/0314700 A1* | 9/2024 | Wigren .............. | H04W 52/143 |
| 2024/0323853 A1* | 9/2024 | Arputharaj .......... | H04W 52/367 |
| 2024/0430816 A1* | 12/2024 | Bhattacharya ........ | H04L 1/0002 |
| 2024/0430817 A1* | 12/2024 | Vempati .............. | H04W 52/281 |
| 2024/0430824 A1* | 12/2024 | Bhattacharya ...... | H04W 52/367 |

* cited by examiner

| Use Case | RF Exposure Scenario | | TX Power Limit | |
| | DSI (device state index) | DRI (device range index) | First Frequency Range | Second Frequency Range |
| --- | --- | --- | --- | --- |
| On-body | 0 | 0 | P1 | P4 |
| Off-body, Bystander Detected | 1 | 0 | P2 | P5 |
| Off-body, No Bystander Detected | 1 | 1 | P3 | P6 |

FIG. 8

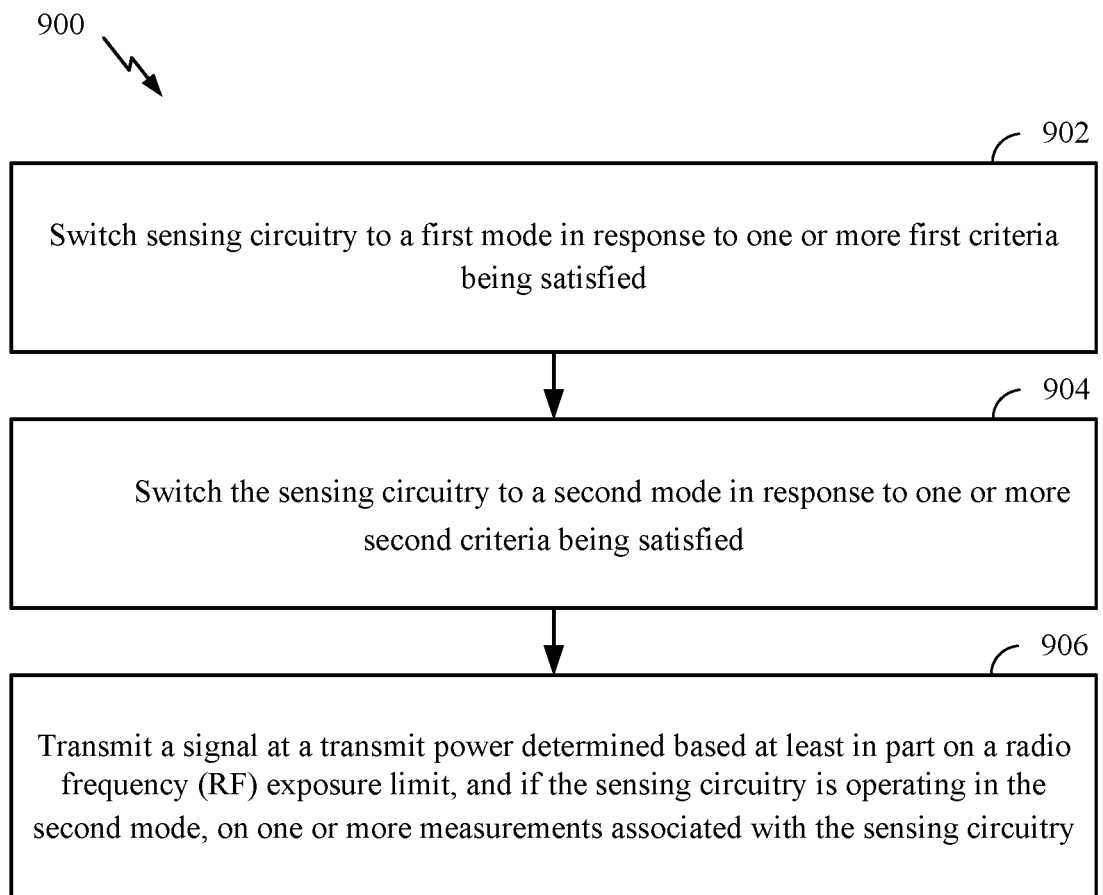

900

902

Switch sensing circuitry to a first mode in response to one or more first criteria being satisfied

904

Switch the sensing circuitry to a second mode in response to one or more second criteria being satisfied

906

Transmit a signal at a transmit power determined based at least in part on a radio frequency (RF) exposure limit, and if the sensing circuitry is operating in the second mode, on one or more measurements associated with the sensing circuitry

FIG. 9

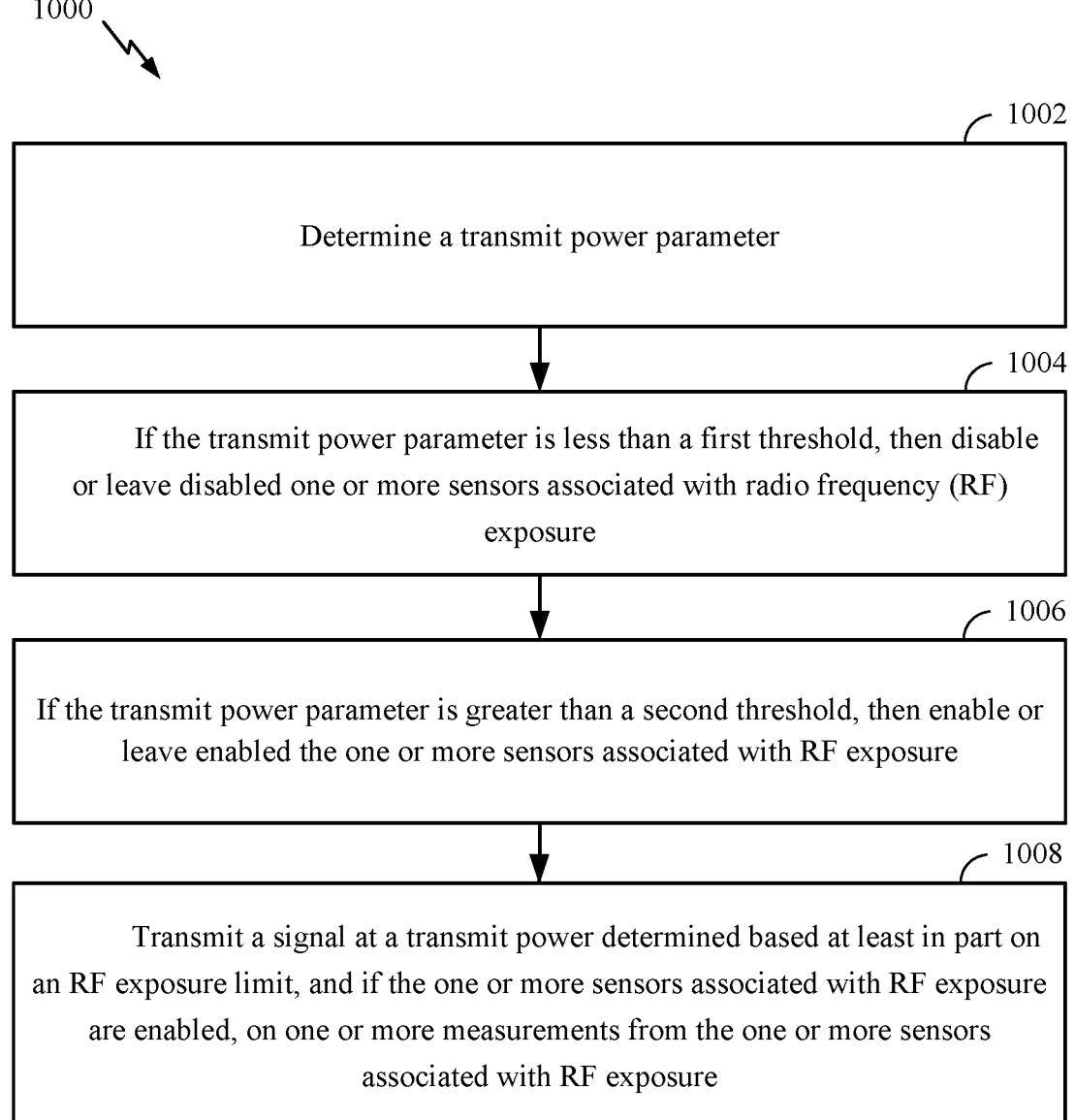

1000

1002

Determine a transmit power parameter

1004

If the transmit power parameter is less than a first threshold, then disable or leave disabled one or more sensors associated with radio frequency (RF) exposure

1006

If the transmit power parameter is greater than a second threshold, then enable or leave enabled the one or more sensors associated with RF exposure

1008

Transmit a signal at a transmit power determined based at least in part on an RF exposure limit, and if the one or more sensors associated with RF exposure are enabled, on one or more measurements from the one or more sensors associated with RF exposure

FIG. 10

SENSING CIRCUITRY FOR RADIO FREQUENCY EXPOSURE COMPLIANCE

CROSS-REFERENCE TO RELATED APPLICATION

This application claims the benefit of U.S. Application Ser. No. 63/376,532 filed on Sep. 21, 2022 and hereby incorporated by reference in its entirety for all purposes.

INTRODUCTION

Field of the Disclosure

Aspects of the present disclosure relate to wireless communications, and more particularly, to radio frequency (RF) exposure compliance.

Description of Related Art

Wireless communication systems are widely deployed to provide various telecommunication services such as telephony, video, data, messaging, broadcasts, etc. Modern wireless devices (such as cellular telephones) are generally mandated to meet radio frequency (RF) exposure limits set by certain governments and international standards and regulations. To ensure compliance with the standards, such devices currently undergo an extensive certification process prior to being shipped to market. To ensure that a wireless device complies with an RF exposure limit, techniques have been developed to enable the wireless device to assess RF exposure from the wireless device and adjust the transmission power of the wireless device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide advantages that include improved wireless communication performance and increased energy efficiency during transmission, for example, due to managing sensing circuitry for evaluating a radio frequency exposure scenario.

Certain aspects of the subject matter described in this disclosure can be implemented in a method for wireless communication by a wireless device. The method generally includes switching sensing circuitry to a first mode in response to one or more first criteria being satisfied, and switching the sensing circuitry to a second mode in response to one or more second criteria being satisfied. The method also includes transmitting a signal at a transmit power determined based at least in part on a radio frequency (RF) exposure limit, and if the sensing circuitry is operating in the second mode, on one or more measurements associated with the sensing circuitry.

Certain aspects of the subject matter described in this disclosure can be implemented in an apparatus for wireless communication. The apparatus includes one or more memories collectively storing computer-executable instructions. The apparatus also includes one or more processors coupled to the one or more memories. The one or more processors are collectively configured to execute the computer-executable instructions to cause the apparatus to perform an operation. The operation includes switching sensing circuitry to a first mode in response to one or more first criteria being satisfied. The operation also includes switching the sensing circuitry to a second mode in response to one or more second criteria being satisfied. The operation further includes transmitting a signal at a transmit power determined based at least in part on a radio frequency (RF) exposure limit, and if the sensing circuitry is operating in the second mode, on one or more measurements associated with the sensing circuitry.

Certain aspects of the subject matter described in this disclosure can be implemented in an apparatus for wireless communication. The apparatus includes means for switching sensing circuitry to a first mode in response to one or more first criteria being satisfied, and means for switching the sensing circuitry to a second mode in response to one or more second criteria being satisfied. The apparatus also includes means for transmitting a signal at a transmit power determined based at least in part on a radio frequency (RF) exposure limit, and if the sensing circuitry is operating in the second mode, on one or more measurements associated with the sensing circuitry.

Certain aspects of the subject matter described in this disclosure can be implemented in a non-transitory computer-readable medium. The non-transitory computer-readable medium includes computer-executable instructions that, when collectively executed by one or more processors of a processing system, cause the processing system to perform a method. The method includes switching sensing circuitry to a first mode in response to one or more first criteria being satisfied, and switching the sensing circuitry to a second mode in response to one or more second criteria being satisfied. The method also includes transmitting a signal at a transmit power determined based at least in part on a radio frequency (RF) exposure limit, and if the sensing circuitry is operating in the second mode, on one or more measurements associated with the sensing circuitry.

Certain aspects of the subject matter described in this disclosure can be implemented in a computer program product. The computer program product is embodied on a computer-readable storage medium. The computer-readable storage medium includes code for performing a method. The method includes switching sensing circuitry to a first mode in response to one or more first criteria being satisfied, and switching the sensing circuitry to a second mode in response to one or more second criteria being satisfied. The method also includes transmitting a signal at a transmit power determined based at least in part on a radio frequency (RF) exposure limit, and if the sensing circuitry is operating in the second mode, on one or more measurements associated with the sensing circuitry.

Certain aspects of the subject matter described in this disclosure can be implemented in a method for wireless communication by a wireless device. The method generally includes determining a transmit power parameter, and if the transmit power parameter is less than a first threshold, then disabling or leaving disabled one or more sensors associated with radio frequency (RF) exposure. The method also includes, if the transmit power parameter is greater than a second threshold, then enabling or leaving enabled the one or more sensors associated with RF exposure. The method also includes transmitting a signal at a transmit power determined based at least in part on an RF exposure limit, and if the one or more sensors associated with RF exposure are enabled, on one or more measurements from the one or more sensors associated with RF exposure.

Certain aspects of the subject matter described in this disclosure can be implemented in an apparatus for wireless communication. The apparatus includes one or more memories collectively storing computer-executable instructions. The apparatus also includes one or more processors coupled to the one or more memories. The one or more processors are collectively configured to execute the computer-executable instructions to cause the apparatus to perform an operation. The operation includes determining a transmit power parameter. The operation also includes, if the transmit power parameter is less than a first threshold, then disabling or leaving disabled one or more sensors associated with radio frequency (RF) exposure. The operation also includes, if the transmit power parameter is greater than a second threshold, then enabling or leaving enabled the one or more sensors associated with RF exposure. The operation further includes transmitting a signal at a transmit power determined based at least in part on an RF exposure limit, and if the one or more sensors associated with RF exposure are enabled, on one or more measurements from the one or more sensors associated with RF exposure.

Certain aspects of the subject matter described in this disclosure can be implemented in an apparatus for wireless communication. The apparatus includes means for determining a transmit power parameter. The apparatus also includes, if the transmit power parameter is less than a first threshold, means for disabling or means for leaving disabled one or more sensors associated with radio frequency (RF) exposure. The apparatus also includes, if the transmit power parameter is greater than a second threshold, means for enabling or means for leaving enabled the one or more sensors associated with RF exposure. The apparatus further includes means for transmitting a signal at a transmit power determined based at least in part on an RF exposure limit, and if the one or more sensors associated with RF exposure are enabled, on one or more measurements from the one or more sensors associated with RF exposure.

Certain aspects of the subject matter described in this disclosure can be implemented in a non-transitory computer-readable medium. The non-transitory computer-readable medium includes computer-executable instructions that, when collectively executed by one or more processors of a processing system, cause the processing system to perform a method. The method includes determining a transmit power parameter, and if the transmit power parameter is less than a first threshold, then disabling or leaving disabled one or more sensors associated with radio frequency (RF) exposure. The method also includes, if the transmit power parameter is greater than a second threshold, then enabling or leaving enabled the one or more sensors associated with RF exposure. The method also includes transmitting a signal at a transmit power determined based at least in part on an RF exposure limit, and if the one or more sensors associated with RF exposure are enabled, on one or more measurements from the one or more sensors associated with RF exposure.

Certain aspects of the subject matter described in this disclosure can be implemented in a computer program product. The computer program product is embodied on a computer-readable storage medium. The computer-readable storage medium includes code for performing a method. The method includes determining a transmit power parameter, and if the transmit power parameter is less than a first threshold, then disabling or leaving disabled one or more sensors associated with radio frequency (RF) exposure. The method also includes, if the transmit power parameter is greater than a second threshold, then enabling or leaving enabled the one or more sensors associated with RF exposure. The method also includes transmitting a signal at a transmit power determined based at least in part on an RF exposure limit, and if the one or more sensors associated with RF exposure are enabled, on one or more measurements from the one or more sensors associated with RF exposure.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 8 is a table illustrating example transmit power limits associated with different device use cases, in accordance with certain aspects of the present disclosure.

FIG. 9 is a flow diagram illustrating example operations for wireless communication by a wireless device, in accordance with certain aspects of the present disclosure.

FIG. 10 is a flow diagram illustrating additional example operations for wireless communication by a wireless device, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
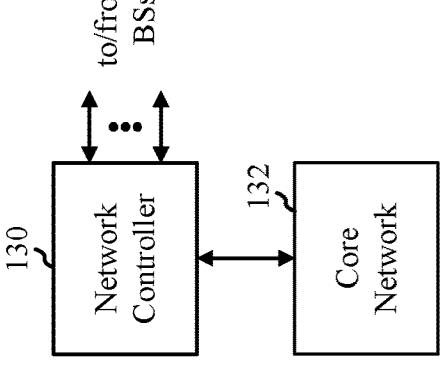
FIG. 1 is a block diagram conceptually illustrating an example wireless communication network, in accordance with certain aspects of the present disclosure.

Aspects of the present disclosure provide apparatus, methods, processing systems, and computer-readable mediums for triggering sensing circuitry control for radio frequency (RF) exposure compliance.

In certain cases, RF exposure compliance for a wireless device may differ depending on an RF exposure scenario exhibited by the wireless device. For example, the wireless device may be near the user's head, body, and/or hand, where the RF exposure may be higher. In some cases, the wireless device may be positioned away from the user's body (e.g., when charging or being used as a hotspot), where the RF exposure may be lower. A different RF exposure limit (e.g., a time-averaged transmit power limit) for RF exposure compliance may be used depending on the RF exposure scenario exhibited by the wireless device. Certain RF exposure scenarios may be indicated via a device state index (DSI) and/or a device range index (DRI), where the DSI may indicate whether the wireless device is on or off the body of the user, and the DRI may indicate whether the wireless device is within a certain range of exposing human tissue to RF, as further described herein.

A wireless device may use sensing circuitry to determine the RF exposure scenario of the wireless device. Repeatedly operating sensing circuitry to evaluate the RF exposure scenario increases the power consumption of the wireless devices. In certain cases, operating the sensing circuit too frequently to evaluate the RF exposure scenario may result in wasted energy, for example, when the wireless device is transmitting at a power level below the RF exposure limit associated with the current RF exposure scenario. In some cases, operating the sensing circuitry (e.g., proximity circuitry that uses radar to detect objects) may generate interference for wireless communications, such as self-interference at the wireless device or interference for other wireless devices.

Aspects of the present disclosure provide apparatus and methods for triggering sensing circuitry for RF exposure compliance. As an example, a wireless device (e.g., a user equipment (UE) or a customer premises equipment (CPE)) may evaluate the RF exposure scenario using sensing circuitry if a transmit power parameter satisfies a certain criterion (e.g., an average transmit power is greater than or equal to a threshold). In this example, the sensing circuitry may determine an RF exposure scenario of the wireless device, and the wireless device may transmit a signal at a transmit power based on an RF exposure limit associated with the RF exposure scenario (e.g., a device use case). The wireless device may refrain from using the sensing circuitry to evaluate the RF exposure scenario if the transmit power parameter does not satisfy a certain criterion (e.g., the average transmit power is less than or equal to a threshold). The wireless device may transmit a signal at a transmit power based on RF exposure compliance without using the sensing circuitry to determine an RF exposure scenario.

The apparatus and methods for triggering sensing circuitry described herein may facilitate improved wireless communication performance (e.g., lower latencies, higher throughput, lower block error rate (BER), and/or reduced interference) and/or increased energy efficiency. For example, if a wireless device is transmitting at a high average transmit power in compliance with an RF exposure limit, then the sensing circuitry may be used to determine whether the wireless device is in an RF exposure scenario that may utilize increased, higher transmit powers, such as a hotspot exposure scenario. In such cases, the sensing circuitry may enable increased uplink or sidelink performance or throughput, due to the higher transmit power. In some cases, if the wireless device is transmitting at a low average transmit power in compliance with an RF exposure limit, then the wireless device may refrain from using the sensing circuitry to evaluate the RF exposure scenario. In such cases, the sensing circuitry may be operated less frequently (e.g., an inertial measurement unit (IMU) being used for other purposes) or in an idle mode (e.g., in a low power state or powered off), and the wireless device may benefit from reduced power consumption from the sensing circuitry and/or reduced interference due to certain sensing circuitry (e.g., an RF-based proximity sensor). In all use case conditions, the wireless device may transmit signals at a transmit power to ensure RF exposure compliance for the given use case (e.g., RF exposure scenario) of the wireless device.

The following description provides examples of RF exposure compliance in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs, or may support multiple RATs.

The techniques described herein may be used for various wireless networks and radio technologies. While aspects may be described herein using terminology commonly associated with 3G, 4G, and/or 5G (e.g., New Radio (NR)) wireless technologies, aspects of the present disclosure can be applied in other generation-based communication systems and/or to wireless technologies such as 802.11, 802.15, etc.

NR access may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR supports beamforming, and beam direction may be dynamically configured. Multiple-input, multiple-output (MIMO) transmissions with precoding may also be supported, as may multi-layer transmissions. Aggregation of multiple cells may be supported.

Example Wireless Communication Network and Devices

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc. As shown in FIG. 1, the UE 120a includes an RF exposure manager 122 that controls certain sensing circuitry for RF exposure scenario evaluation, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
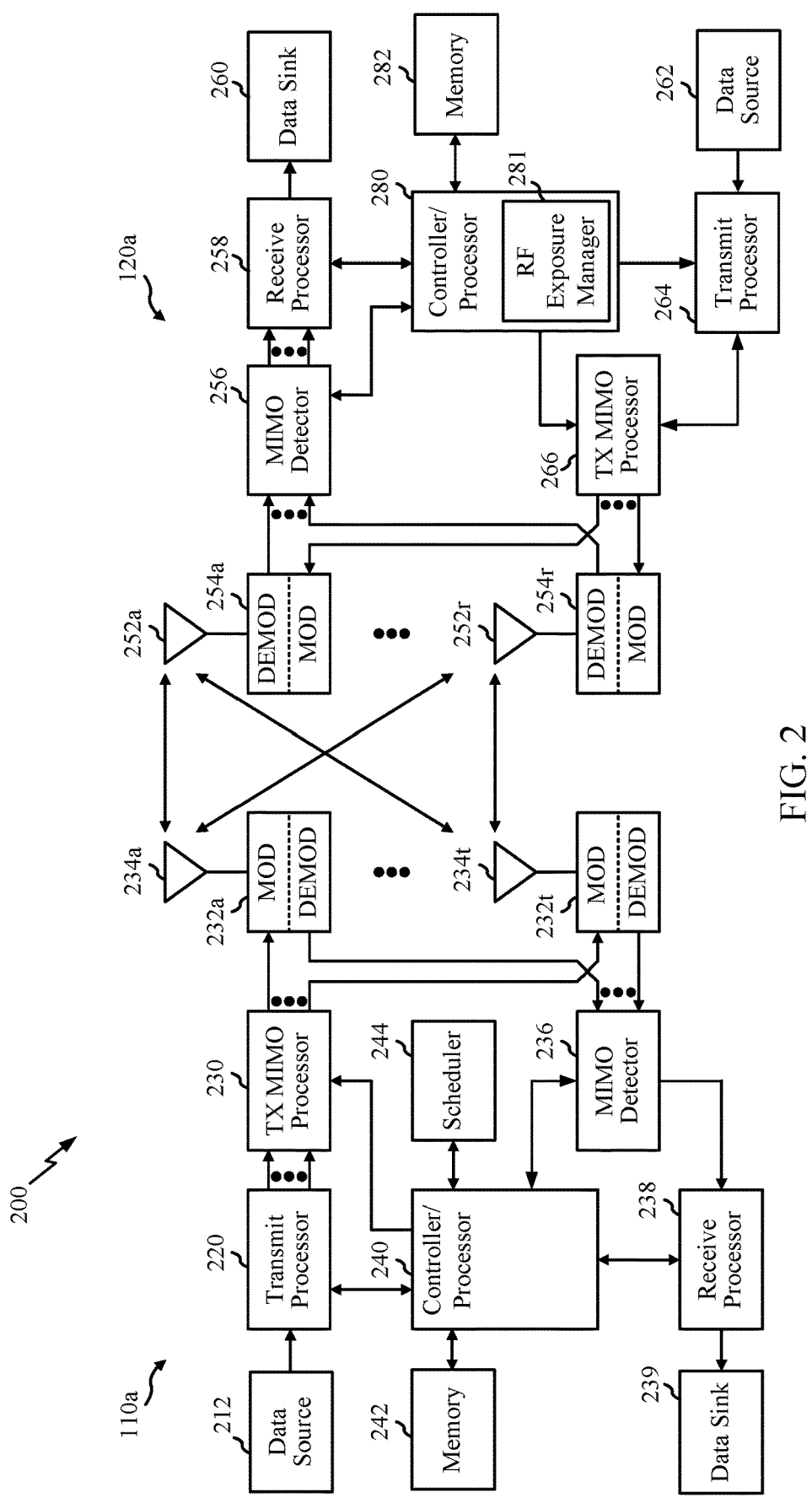
FIG. 2 is a block diagram conceptually illustrating a design of an example a base station (BS) and user equipment (UE), in accordance with certain aspects of the present disclosure.

FIG. 2 illustrates example communication components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each of the transceivers 232a-232t may further process (e.g., convert to analog, amplify, filter, and upconvert) the output sample stream to obtain a downlink signal. Downlink signals from the transceivers 232a-232t may be transmitted via the antennas 234a-234t, respectively.

At the UE 120a, the antennas 252a-252r may receive the downlink signals from the BS 110a and may provide received signals to the transceivers 254a-254r, respectively. The transceivers 254a-254r may condition (e.g., filter, amplify, downconvert, and digitize) a respective received signal to obtain input samples. Each demodulator (DEMOD) in the transceivers 232a-232t may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for single-carrier frequency division multiplexing (SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has an RF exposure manager 281 that is representative of the RF exposure manager 122, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some aspects, the BS 110a illustrated in FIG. 2 and described above is an example of another UE 120.

Example RF Transceiver

Figure 3:
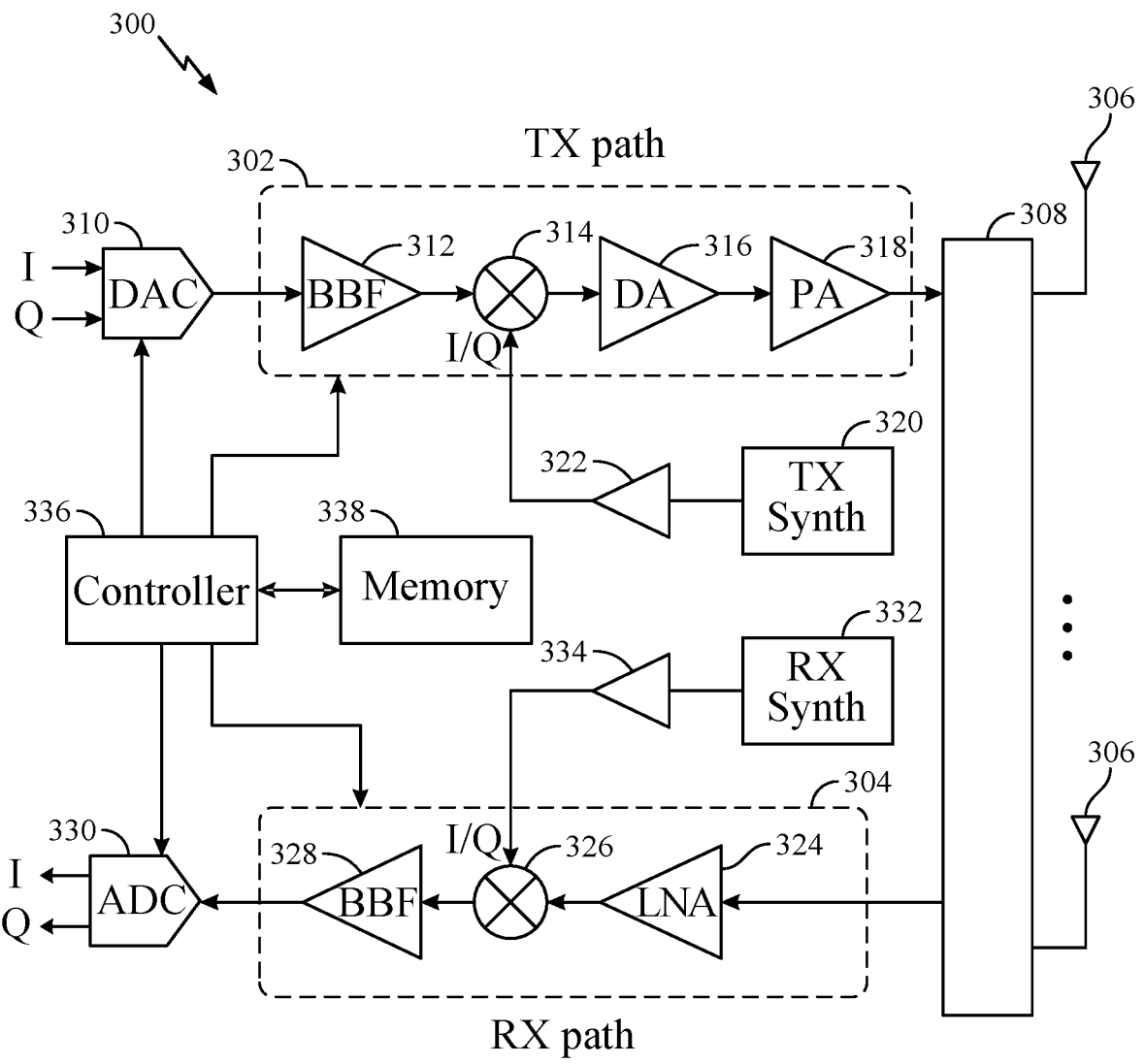
FIG. 3 is a block diagram of an example radio frequency (RF) transceiver, in accordance with certain aspects of the present disclosure.

FIG. 3 is a block diagram of an example RF transceiver circuit 300, in accordance with certain aspects of the present disclosure. The RF transceiver circuit 300 includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency (IF) signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Certain transceivers may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine a transmit power applied to the TX path 302 (e.g., certain levels of gain at the PA 318) that complies with an RF exposure limit set by country-specific regulations and/or international standards as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of $mW/cm^2$. In certain cases, a maximum permissible exposure (MPE) limit in terms of PD may be imposed for wireless devices using transmission frequencies above 6 GHz. The MPE limit is a regulatory metric for exposure based on area, e.g., an energy density limit defined as a number, X, watts per square meter $(W/m^2)$ averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., Long-Term Evolution (LTE)), 5G (e.g., NR in 6 GHz bands), IEEE 802.11ac, etc. PD may be used to assess RF exposure for transmission frequencies higher than 6 GHz, which cover wireless communication technologies such as IEEE 802.11ad, 802.11ay, 5G in mmWave bands, etc. Thus, different metrics may be used to assess RF exposure for different wireless communication technologies.

A wireless device (e.g., UE 120, CPE) may simultaneously transmit signals using multiple wireless communication technologies. For example, the wireless device may simultaneously transmit signals using a first wireless communication technology operating at or below 6 GHz (e.g., 3G, 4G, 5G, etc.) and a second wireless communication technology operating above 6 GHz (e.g., mmWave 5G in 24 to 60 GHz bands, IEEE 802.11ad or 802.11ay). In certain aspects, the wireless device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. As used herein, sub-6 GHz bands may include frequency bands of 300 MHz to 6,000 MHz in some examples, and may include bands in the 6,000 MHz and/or 7,000 MHz range in some examples.

Figures 4A, 4B:
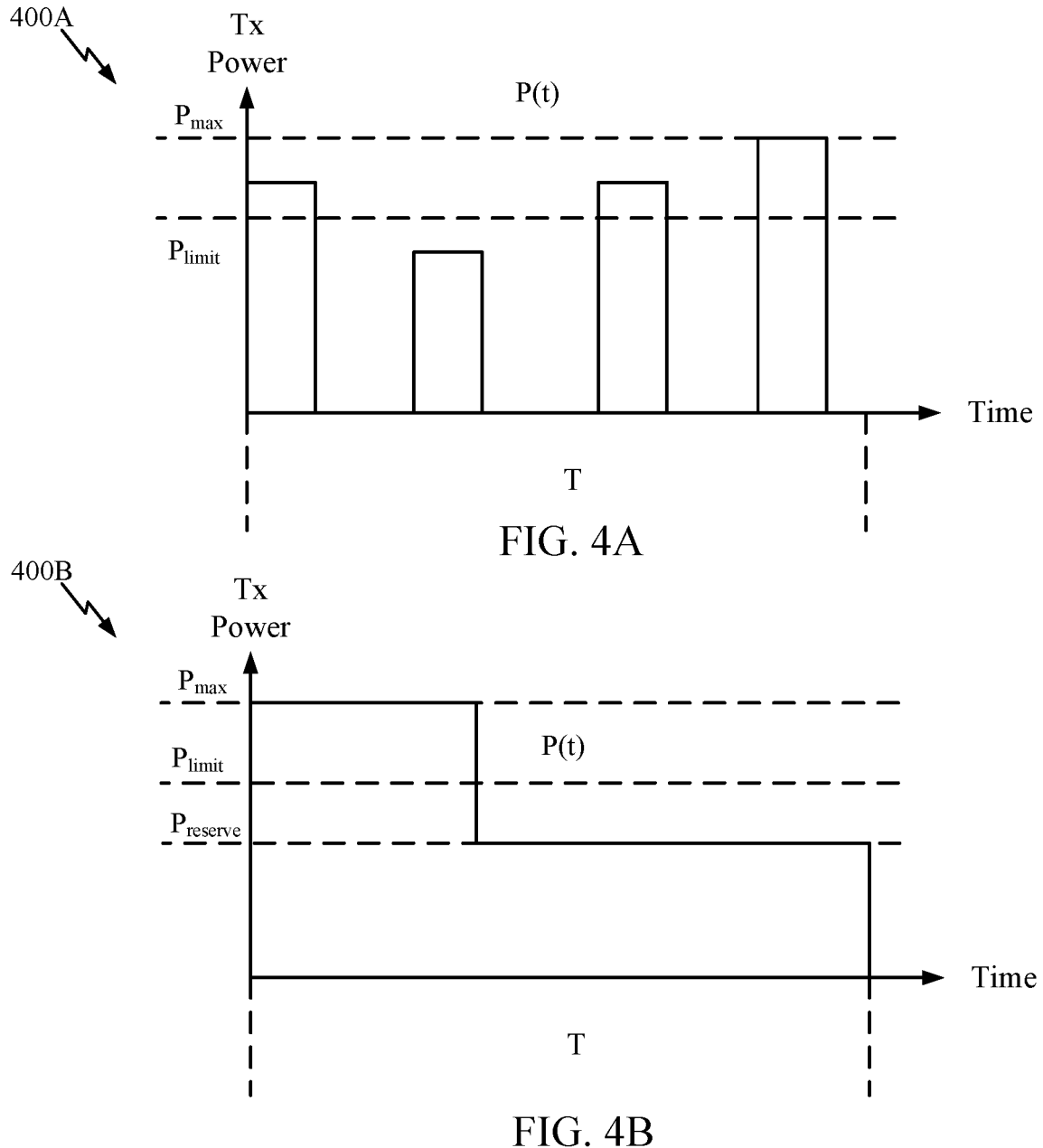
FIGS. 4A and 4B are graphs illustrating examples of transmit powers over time in compliance with a time-averaged RF exposure limit, in accordance with certain aspects of the present disclosure.

In certain cases, compliance with an RF exposure limit may be performed as a time-averaged RF exposure evaluation within a specified moving time window (T) (e.g., 2 seconds for 60 GHz bands, 100 or 360 seconds for bands ≤6 GHz, etc.) associated with the RF exposure limit. For example, FIG. 4A is a graph 400A of a transmit power over time (P(t)) that varies over the time window (T) associated with the RF exposure limit, in accordance with certain aspects of the present disclosure. As an example, the instantaneous transmit power may exceed a maximum time-averaged transmit power level $P_{limit}$ in certain transmission occasions in the time window (T). That is, the transmit power may be greater than the maximum time-averaged transmit power level $P_{limit}$. In certain cases, the UE may transmit at $P_{max}$, which may be the maximum transmit power supported by the UE. In some cases, the UE may transmit at a transmit power less than or equal to the maximum time-averaged transmit power level $P_{limit}$ in certain transmission occasions. The maximum time-averaged transmit power level $P_{limit}$ represents the time-averaged threshold in terms of transmit power for the RF exposure limit over the time window (T), and in certain cases, $P_{limit}$ may be referred to as the maximum time-averaged power level or limit. The graph 400A also illustrates gaps between transmission bursts, where the gaps represent periods during which no transmission was sent from the device. In certain cases, the transmit power may be maintained at the maximum average transmit power level (e.g., $P_{limit}$) allowed for RF exposure compliance to enable continuous transmission during the time window.

FIG. 4B is a graph 400B of a transmit power over time (P(t)) illustrating a time-average mode that provides a reserve power to enable a continuous transmission within the time window (T), in accordance with certain aspects of the present disclosure. As shown, the transmit power may be backed off from the maximum instantaneous power $(P_{max})$ to a reserve power $(P_{reserve})$ before the transmitter would be turned off to reserve enough transmit power (e.g., difference between $P_{limit}$ and $P_{reserve}$) so that the UE can continue transmitting at the lower power $(P_{reserve})$ to maintain a continuous transmission during the time window (e.g., maintain a radio connection with a receiving entity). In some aspects, $P_{reserve}$ is set at a minimum power used to maintain a link or at such minimum power plus a margin. The transmit duration at $P_{max}$ may be referred to as the burst transmit time (or high power duration). When more margin is available in the future (after T seconds), the transmitter may be allowed to transmit at a higher power again (e.g., in short bursts at $P_{max}$).

While the reserve power $(P_{reserve})$ is illustrated in FIG. 4B as being used during the time window (T), in some aspects, the UE may not use the reserve power $(P_{reserve})$. For example, the UE may transit at $P_{max}$ for the burst transmit time and refrain from transmitting for the duration of the time window. In such cases, the UE may have an unused portion of the $P_{reserve}$. The UE may use the usage of the $P_{reserve}$ to manage certain sensing circuitry as further described herein.

In some aspects, the UE may transmit at a power that is higher than the average power level, but less than $P_{max}$ in the time-average mode illustrated in FIG. 4B. While a single transmit burst is illustrated in FIG. 4B, it will be understood that the UE may instead utilize a plurality of transmit bursts within the time window (T), for example, as described herein with respect to FIG. 4A, where the transmit bursts are separated by periods during which the transmit power is maintained at or below $P_{reserve}$. Further, it will be understood that the transmit power of each transmit burst may vary (either within the burst and/or in comparison to other bursts), and that at least a portion of the burst may be transmitted at a power above the maximum average power level (e.g., $P_{limit}$). In some aspects, the UE may not use the reserve power ($P_{reserve}$).

Example Sensing Circuitry for Radio Frequency Exposure Compliance

Multi-mode/multi-band UEs have multiple transmit antennas, which can simultaneously transmit in sub-6 GHz bands and bands greater than 6 GHz bands, such as mmWave bands. As described herein, the RF exposure of sub-6 GHz bands may be evaluated in terms of SAR, and the RF exposure of bands greater than 6 GHz may be evaluated in terms of PD. Due to the regulations on simultaneous exposure, the wireless device may limit maximum transmit power for both sub-6 GHz bands and bands greater than 6 GHz.

Aspects of the present disclosure provide apparatus and methods for triggering sensing circuitry for RF exposure compliance. As an example, a wireless device (e.g., a user equipment (UE) or a customer premises equipment (CPE)) may evaluate the RF exposure scenario using sensing circuitry if a transmit power parameter satisfies a certain criterion (e.g., an average transmit power is greater than or equal to a threshold). In this example, the sensing circuitry may determine an RF exposure scenario of the wireless device, and the wireless device may transmit a signal at a transmit power based on a power limit associated with an RF exposure limit and the RF exposure scenario. The wireless device may refrain from using the sensing circuitry to evaluate the RF exposure scenario if the transmit power parameter does not satisfy a certain criterion (e.g., the average transmit power is less than or equal to a threshold). The wireless device may transmit a signal at a transmit power based on RF exposure compliance without using the sensing circuitry to determine an RF exposure scenario.

The apparatus and methods for managing sensing circuitry described herein may facilitate improved wireless communication performance (e.g., lower latencies, higher throughput, lower block error rate, and/or reduced interference between wireless networks), increased energy efficiency, and/or reduced interference. In some cases, the wireless device may be transmitting at high average power or may have multiple radios active, such that the total RF exposure is high and approaching an RF exposure limit. In such cases, the transmit power for one or more RATs may be set according to an RF exposure limit, for example, as described herein with respect to FIG. 4B. The apparatus and methods for managing sensing circuitry described herein may trigger certain sensing circuitry to evaluate an RF exposure scenario, for example, to detect device motion and/or proximity of a user and/or bystander. Under certain RF exposure scenarios or use cases (e.g., a hotspot RF exposure scenario or when the device is on edge of coverage and could use higher transmit power), the wireless device may transmit at a higher transmit power if the device is not near the body and still comply with the RF exposure limits. The apparatus and methods for managing sensing circuitry described herein may lead to increased wireless communication performance due to the higher allowed transmit power.

In certain cases, the wireless device may be transmitting at a lower average power, where the transmit power is under the RF exposure limit. In such cases, the wireless device may refrain from using the sensing circuitry to evaluate the RF exposure scenario. The apparatus and methods for managing sensing circuitry described herein may enable reduced power consumption and/or reduced interference due to the sensing circuitry not being used for RF exposure evaluation.

Figure 5:
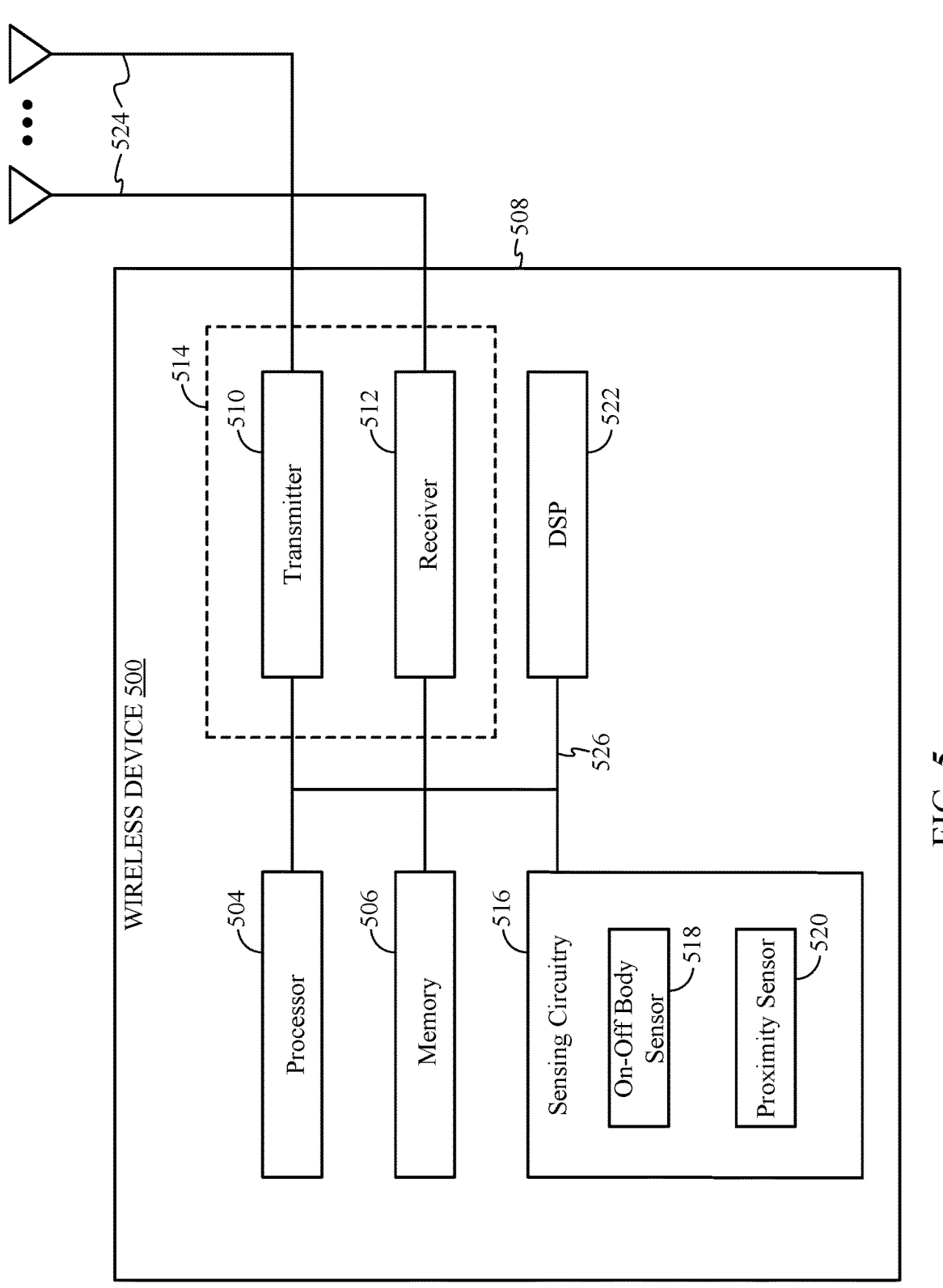
FIG. 5 illustrates a block diagram of an example wireless device with sensing circuitry, in accordance with certain aspects of the present disclosure.

FIG. 5 illustrates an example wireless device 500 in which aspects of the present disclosure may be implemented. In some cases, the wireless device 500 may be a battery-operated device such as a cellular phone, a personal digital assistant (PDA), a handheld device, a wireless device, a laptop computer, a tablet, a smartphone, a wearable device, etc. In certain cases, the wireless device 500 may be a customer premises equipment (CPE). In certain aspects, the UE 120a or the BS 110 may be an example of the wireless device 500.

The wireless device 500 may include a processor 504 that controls operation of the device 500. The processor 504 may also be referred to as a central processing unit (CPU). Memory 506, which may include both read-only memory (ROM) and random access memory (RAM), provides instructions and data to the processor 504. A portion of the memory 506 may also include non-volatile random access memory (NVRAM). The processor 504 typically performs logical and arithmetic operations based on program instructions stored within the memory 506. The processor 504 may manage the mode in which sensing circuitry 516 is operating as further described herein.

In certain aspects, the wireless device 500 may also include a housing 508 that may include a transmitter 510 and a receiver 512 to allow transmission and reception of data between the wireless device 500 and a remote location. For certain aspects, the transmitter 510 and receiver 512 may be combined into a transceiver 514. One or more antennas 524 may be attached or otherwise coupled to the housing 508 and electrically connected to the transceiver 514. The wireless device 500 may also include (not shown) multiple transmitters, multiple receivers, and/or multiple transceivers.

The wireless device 500 may also include sensing circuitry 516 that may be used in an effort to determine an RF exposure scenario. The processor 504 may be in communication with the sensing circuitry 516 to read measurements from the sensing circuitry 516 and/or control the mode of the sensing circuitry 516, as further described herein. The measurements of the sensing circuitry 516 may be indicative of an RF exposure scenario. For example, the sensing circuitry 516 may detect certain movements of the wireless device 500, such as accelerations, where the detected movements may indicate that the wireless device 500 is on the body of a user (e.g., in the pocket or hand). The on-off body sensor 518 may detect whether the wireless device 500 is held in the hand and against the head of the user.

The sensing circuitry 516 may operate in multiple different modes, which may be controlled by the processor 504. For example, the sensing circuitry 516 may be operated in a first mode where the processor 504 refrains from reading measurements from the sensing circuitry 516 for evaluating the RF exposure scenario. The sensing circuitry 516 may be operated in a second mode where the processor 504 reads measurements from the sensing circuitry 516 for evaluating the RF exposure scenario. The first mode may be considered a low power and/or low interference mode, whereas the second mode may be considered a normal operating mode.

The sensing circuitry 516 may include an on-off body sensor 518, a proximity sensor 520, and/or any other suitable sensor that may be used for human and/or object detection. The on-off body sensor 518 may detect whether the wireless device 500 is on or off human tissue. For example, the on-off body sensor 518 may detect that the wireless device 500 is in a pocket of a user or held in a hand of the user. The on-off body sensor 518 may include one or more accelerometers, an inertial measurement unit, a capacitive sensor, an infrared sensor, a visible light sensor or camera, a pressure sensor, etc.

The proximity sensor 520 may detect whether human tissue is nearby or proximate to the wireless device 500. For example, the proximity sensor 520 may detect that there is no human tissue within a certain range of the wireless device 500 to enable a higher transmit power, such as in a hotspot exposure scenario. The proximity sensor 520 may include a radar sensor, a frequency-modulated continuous-wave (FMCW) sensor, a transceiver (e.g., the transceiver 514), etc. In certain cases, the proximity sensor 520 (e.g., an FMCW radar) may transmit a wide bandwidth RF pulse and monitor for reflections to detect objects proximate to the wireless device 500 using radar. The proximity sensor 520 may generate radio interference, such as self-interference at the wireless device 500 and/or interference at other wireless devices, such as another UE. In certain aspects, there may be scheduling conflicts between the FMCW radar and other physical channels (e.g., PUSCH, PUCCH, PDSCH, and/or PDCCH). That is, if the FMCW radar transmits a pulse during a scheduled downlink or uplink transmission, the FMCW radar can impact downlink and/or uplink performance at the wireless device 500 and/or at other wireless devices. In certain cases, the FMCW radar may transmit the pulse in certain transmission occasions, such as a random access occasion, to reduce the impact of interference. Using the apparatus and methods for performing sensing circuitry control with RF exposure compliance described herein may reduce the impact of interference and scheduling conflicts described above.

In certain aspects, the proximity sensor 520 may be operated when the on-off body sensor 518 detects that the wireless device 500 is off the body of the user. The proximity sensor 520 may be in an idle mode until the on-off body sensor 518 detects that the wireless device 500 is off the body of the user.

The wireless device 500 may also include a digital signal processor (DSP) 522 for use in processing signals. For example, the DSP 522 may modulate/demodulate signals for transmission or reception according to various wireless communication standards, such as NR, E-UTRA, UMTS, CDMA, and/or IEEE. In some configurations, the processor 504 and DSP 522 are implemented together. In some examples, the processor 504 and/or DSP 522 include or are included within a modem. In some examples, the DSP 522 determines and/or controls power available to the transmitter 510, for example based on measurements from the sensing circuitry 516, and the processor 504 controls operation of the sensing circuitry 516, for example based on a power or other information from the DSP 522. In some aspects, the processor 504 and/or DSP 522 may be representative of any of the processor(s) described herein with respect to FIGS. 2 and 3. For example, the processor 504 may correspond to the controller/processor 280 and/or the controller 336, and the DSP 522 may correspond to the modulators/demodulators in the transceivers 254a-254r.

It should be understood that aspects of the present disclosure may be used in a variety of applications. Although the present disclosure is not limited in this respect, the circuits disclosed herein may be used in many apparatuses, such as in a computer, a communication system, a television, audio equipment such as music players and microphones, camera equipment, and test equipment. Communication systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDAs), and the like.

Figure 6:
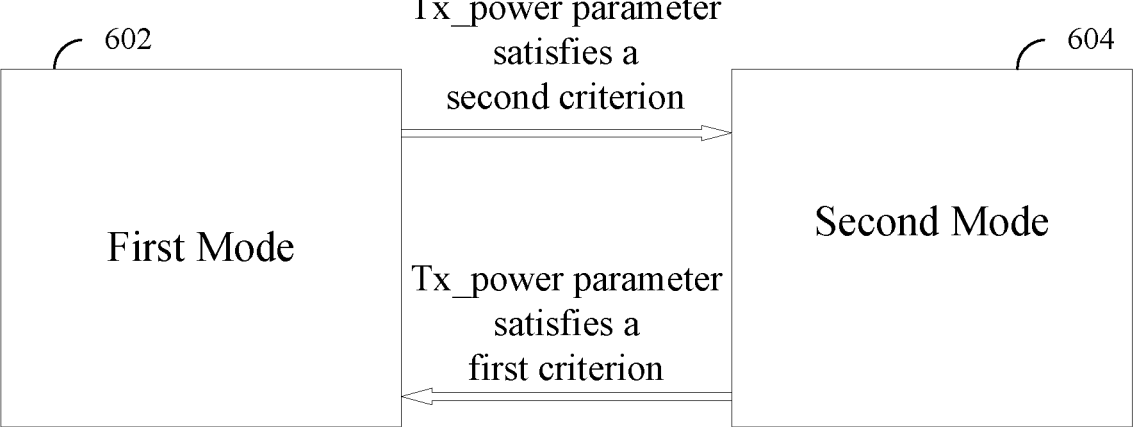
FIG. 6 is a diagram illustrating example modes of sensing circuitry, in accordance with certain aspects of the present disclosure.

FIG. 6 is a diagram of example modes of sensing circuitry (e.g., the sensing circuitry 516), in accordance with certain aspects of the present disclosure. The sensing circuitry may operate in a first mode 602. The operation of the sensing circuitry in the first mode 602 may consume a certain amount of power and/or generate a certain amount of interference. In the first mode 602, the wireless device may refrain from obtaining (e.g., reading) one or more measurements from the sensing circuitry to evaluate compliance with the RF exposure limit (e.g., evaluating the RF exposure scenario). In some cases, the sensing circuitry may be disabled in the first mode 602. In certain cases, the sensing circuitry may operate in an idle mode (e.g., power saving mode or low interference mode), while in the first mode 602. In some cases, the wireless device may refrain from polling for on-off body and/or object proximity results to evaluate the RF exposure scenario while in the first mode 602. In certain cases, the wireless device may refrain from scheduling the use of certain sensing circuitry, such as an FMCW radar, while in the first mode 602. In some cases, while in the first mode 602, the sensing circuitry may be in an idle mode, where the sensing circuitry may be temporarily turned off or in a low power state. The first mode 602 may not mean that the sensing circuitry is powered off, non-operational, or in a low powered state. In the first mode 602, the wireless device may refrain from actively polling the sensing circuitry for measurements to perform the RF exposure evaluation, and thus, the wireless device may not increase power consumption beyond operations outside (or independent) of the RF exposure evaluation. For example, the first mode 602 may not preclude an accelerometer (or another sensor) from being used by the wireless device to determine if the device is in a portrait or landscape orientation independent of the RF exposure evaluation. When in the first mode 602, the wireless device may transmit a signal at a transmit power determined based at least in part on an RF exposure limit without any measurements associated with the sensing circuitry. A transmit power limit (e.g., $P_{limit}$) associated with the RF exposure limit may be set in response to the sensing circuitry operating in the first mode. For example, the transmit power limit may be set to a default transmit power limit when in power saving mode/low interference mode.

The sensing circuitry may also operate in a second mode 604. The operation of the sensing circuitry in the second mode 604 may consume an increased amount of power and/or generate an increased amount of interference relative to the first mode 602. In some cases, the wireless device may obtain one or more measurements from the sensing circuitry to evaluate compliance with the RF exposure limit (e.g., evaluating the RF exposure scenario), while in the second mode 604. The wireless device may poll for on-off body and/or object proximity results to determine the RF exposure scenario, while in the second mode 604. The wireless device may schedule the use of certain sensing circuitry, such as an FMCW radar, while in the second mode 604. In some cases, the wireless device may schedule the FMCW radar if the on-off body sensor detects that the wireless device is off the body of the user. In the second mode 604, the wireless device may transmit a signal at a transmit power determined based at least in part on an RF exposure limit and on one or more measurements associated with the sensing circuitry. The transmit power limit (e.g., $P_{limit}$) may be adjusted in response to one or more measurements associated with the sensing circuitry operating in the second mode. For example, if the measurements associated with the sensing circuitry indicate that the wireless device is in in a hotspot scenario, then the transmit power limit may be adjusted for the particular RF exposure scenario.

For certain aspects, the sensing circuitry may transition from operating in the second mode 604 to operating in the first mode 602 when the transmit power parameter satisfies a first criterion (e.g., in response to identifying or detecting that the first criterion is satisfied). In some cases, the transmit power parameter may satisfy the first criterion, if the transmit power parameter is less than (or, in some cases, equal to) a certain threshold associated with the first criterion. The first criterion may be equal to the second criterion in some examples, and may be different in other examples.

In certain aspects, the sensing circuitry may transition from operating in the first mode 602 to operating in the second mode 604 when a transmit power parameter of the wireless device satisfies a second criterion (e.g., in response to identifying or detecting that the second criterion is satisfied). The transmit power parameter may include a current (e.g., instantaneous) transmit power or an average transmit power over a duration (such as the time window associated with an RF exposure limit). In some cases, the transmit power parameter may satisfy the second criterion if the transmit power parameter is greater than (or, in some cases, equal to) a certain threshold associated with the second criterion.

The first criterion and/or second criterion may be associated with various transmit power parameters to trigger transitioning between the first mode 602 and the second mode 604. The transmit power parameter(s) and corresponding threshold(s) may include an average transmit power over a duration (such as a time window associated with the RF exposure limit). For example, the wireless device may switch to the second mode 604, if the average transmit power over the time window (e.g., T in FIGS. 4A and 4B) is greater than (or, in some cases, equal to) a threshold.

The transmit power parameter(s) and corresponding threshold(s) may include a normalized RF exposure associated with one or more radios of the wireless device. The normalized RF exposure for an antenna group may be determined according to the following expression:

$$total.NE.usage = \sum_i \frac{NE.usage_i}{W_i} \tag{1}$$

where $W_i$ is the number of intervals corresponding to the RF exposure compliance time window for the $i^{th}$ radio, and $NE.usage_i$ is the accumulated normalized exposure over the past $W_i$ intervals for the $i^{th}$ radio. The wireless device may update the normalized RF exposure (total.NE.usage$_j$) for the $j^{th}$ antenna group periodically, for example, every X milliseconds. The first criterion may be satisfied if a greatest value among the total.NE.usage$_j$ of the antenna groups is less than a first threshold value (TH_1):

$$\max_j total.NE.usage_j < TH\_1,$$

and the second criterion may be satisfied if a greatest value among the total.NE.usage$_j$ of the antenna groups is greater than a second threshold value (TH_2):

$$\max_j total.NE.usage_j > TH\_2.$$

In certain cases, the first threshold associated with the first criterion may be less than the second threshold associated with the second criterion, and the second threshold associated with the second criterion may be less than 1 (e.g., TH_1<TH_2<1). For example, the first threshold associated with the first criterion may be set to a value of 0.1, and the second threshold associated with the second criterion may be set to a value of 0.3.

The transmit power parameter(s) and corresponding threshold(s) may include an RF exposure margin above a reserve associated with the RF exposure limit, such as the $P_{reserve}$ described herein with respect to FIG. 4B. In some cases, the wireless device may use multiple reserves associated with different radios and/or antenna groups. The total reserve may be determined according to the following expression:

$$total.res = \Sigma_i res_i \tag{2}$$

where $res_i$ is a reserve assigned to a particular radio or antenna group (i).

The sum of RF exposures above the reserves may be determined according to the following expression:

$$sum.above.res = \sum_i \max\left(0, \frac{NE.report_i - res_i}{W_i}\right) \tag{3}$$

where $NE.report_i$ is the normalized RF exposure for a particular radio or antenna group (i).

The allowed margin above the reserve may be determined according to the following expression:

$$Allowed.margin.above.res = 1 - total.res - sum.above.res \tag{4}.$$

The transmit power parameter ($\eta$) associated with the margin may be determined according to the following expression:

$$\eta = \frac{sum.above.res}{(1 - total.res)} \tag{5}$$

where the transmit power parameter ($\eta$) associated with the margin can be considered to be a value of 0 to 1 (e.g., $0 \le \eta \le 1$). The first criterion may be satisfied if $\eta$ is greater than a first threshold value, and the second criterion may be satisfied if $\eta$ is less than a second threshold value.

The transmit power parameter(s) and corresponding threshold(s) may include an RF exposure usage relative to the reserve, such as the $P_{reserve}$ described herein with respect to FIG. 4B. In certain aspects, the RF exposure margin above a reserve associated with the RF exposure limit threshold may involve determining the amount of budget available to the wireless device above the reserve. For example, if the reserve usage is below a first threshold, then the wireless device may consider transitioning or transition to operating the sensing circuitry in the first mode 602. If the reserve usage is above a second threshold, then the wireless device may consider transitioning or transition to operating the sensing circuitry in the second mode 604.

The transmit power parameter(s) and corresponding threshold(s) may include a ratio of uplink slots to downlink slots configured for TDD communications. For example, the wireless device may be configured with a first number of uplink slots and a second number of downlink slots across a number of slots for TDD communications. If the ratio of uplink slots to downlink slots is below (e.g., less than) a first threshold, then the wireless device may transition to operating the sensing circuitry in the first mode 602. If the ratio of uplink slots to downlink slots is above (e.g., greater than) a second threshold, then the wireless device may consider transitioning or transition to operating the sensing circuitry in the second mode 604 (e.g., high power mode).

The transmit power parameter(s) and corresponding threshold(s) may include a state associated with discontinuous reception (DRX). In a wireless communication network, the wireless device (e.g., the UE 120) may operate in one of several modes, such as an idle mode or a connected mode, at any given moment. In the connected mode, the wireless device may actively exchange data with one or more devices (e.g., base stations). In the idle mode, the wireless device may operate in a low power state for a certain period of time to conserve power (e.g., battery power) and may wake up periodically to monitor for paging messages (e.g., on the PDCCH). The paging messages may alert the UE of an incoming call and/or data scheduled for downlink. If the wireless device is in a connected mode (e.g., DRX is disabled), then the wireless device may consider transitioning or transition to operating the sensing circuitry in the second mode 604. If the wireless device is in an idle mode (e.g., DRX is enabled), then the wireless device may consider transitioning or transition to operating the sensing circuitry in the first mode 602.

The transmit power parameter(s) and corresponding threshold(s) may include a rate associated with uplink scheduling, a rate associated with downlink scheduling, or a combination thereof. The wireless device may be frequently scheduled for uplink or downlink transmissions, and the wireless device may consider the scheduling rate for uplink/downlink in determining whether to trigger transitioning between the first mode 602 and the second mode 604. For example, if the uplink scheduling rate is greater than a first threshold (and/or if the downlink scheduling rate is less than a second threshold), then the wireless device may consider transitioning or transition to operating the sensing circuitry in the second mode 604. If the uplink scheduling rate is less than the first threshold or a third threshold (and/or if the downlink scheduling rate is greater than the second threshold or a fourth threshold), then the wireless device may consider transitioning or transition to operating the sensing circuitry in the first mode 602.

The transmit power parameter(s) and corresponding threshold(s) may include an uplink/sidelink buffer size. The buffer size may be a size of data stored for uplink or sidelink transmission. A larger buffer size may indicate that the wireless device will be transmitting for an extended period, whereas a short buffer size may indicate that the wireless device will be transmitting for a short period. If the buffer size is greater than a threshold, then the wireless device may consider transitioning or transition to operating the sensing circuitry in the second mode 604. If the buffer size is less than the same or another threshold, then the wireless device may consider transitioning or transition to operating the sensing circuitry in the first mode 602.

The wireless device may consider any combination of the transmit power parameters described herein to trigger transitioning between the first mode 602 and the second mode

604. In certain aspects, the wireless device may assign a weight to each of the transmit power parameters used for evaluating the first criterion and/or second criterion. In some cases, the wireless device may evaluate a different set of transmit power parameters to determine whether the first criterion is satisfied than a set of transmit power parameters to determine whether the second criterion is satisfied. The one or more thresholds associated with the first criterion and/or second criterion may be determined by the wireless device or preconfigured.

In certain aspects, the first criterion may be associated with one or more threshold values. The second criterion may also be associated with one or more threshold values. One or more of the threshold values associated with the first criterion may be the same or different than one or more threshold values associated with the second criterion. The thresholds for the first criterion and the second criterion may be configuration parameters. In certain aspects, the threshold(s) for the second criterion may be set at one or more values to provide enough time for the sensing circuitry to be enabled or powered on or to be scheduled (e.g., during a certain slot or TTI) to facilitate using the sensing circuitry to evaluate the RF exposure scenario.

While two modes are illustrated in FIG. 6, it will be understood that additional modes may be implemented. For example, a third and/or fourth mode may be implemented. In some examples, each additional mode may be associated with respective additional or alternative sensors being enabled or disabled. The order in which the wireless device utilizes the modes may be determined by a priority of sensors included within each mode, how much power the sensors in each mode require to operate, a sensing resolution or distance of the sensors in each mode, a power up time or expected time to schedule sensors in each mode, or other characteristics. Respective criteria and/or thresholds may be used to transition between the various modes.

Those of skill in the art will understand that the transmit power parameters described herein with respect to FIG. 6 are merely examples. Other parameters or categories of parameters may be used in addition to or instead of those described.

Figure 7:
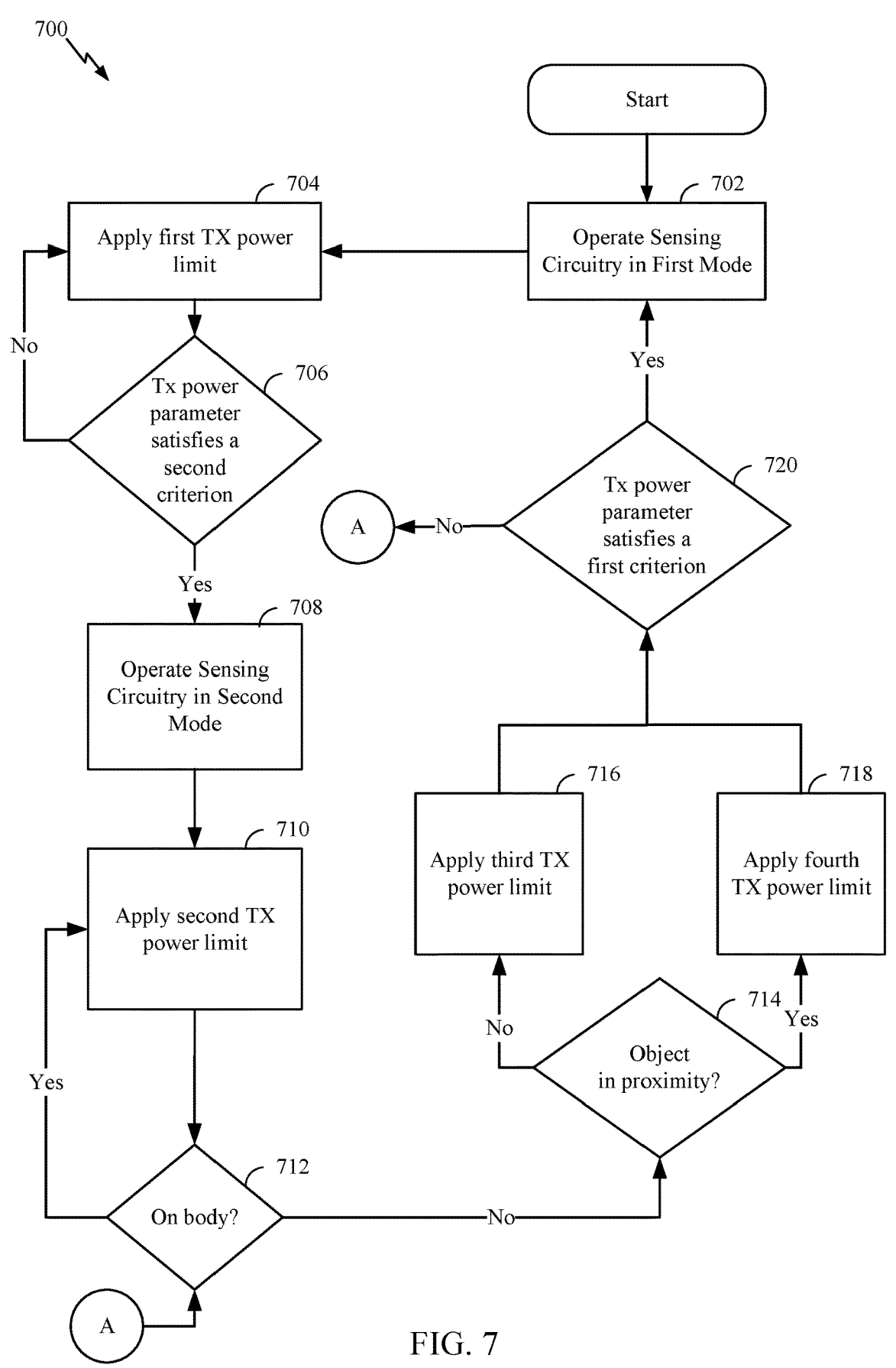
FIG. 7 is a flow diagram illustrating example operations for managing sensing circuitry, in accordance with certain aspects of the present disclosure.

FIG. 7 is a flow diagram of example operations 700 for managing sensing circuitry, in accordance with certain aspects of the present disclosure. The operations 700 may be performed, for example, by a wireless device (e.g., the UE 120a in the wireless communication network 100, or a CPE).

The operations 700 may optionally begin, at block 702, where the wireless device may operate the sensing circuitry in a first mode (e.g., the first mode 602) as described above. While the term "operation" is used in this block, it will be understood that the sensing circuitry may be off or idle, as described above.

At block 704, the wireless device may determine transmit power(s) for transmission(s) in compliance with a first transmit power limit (e.g., a time-averaged transmit power limit $P_{limit}$) associated with the RF exposure limit without using sensing circuitry (e.g., the sensing circuitry 516). As an example, the first transmit power limit may be associated with a default RF exposure scenario, such as an on-body exposure scenario, as further described herein with respect to FIG. 8. In the first mode, the wireless device may refrain from using the sensing circuitry to evaluate the RF exposure scenario of the wireless device. The wireless device may operate with less power consumption and/or less interference, for example, due to the sensing circuitry not being used to evaluate the RF exposure scenario.

At block 706, the wireless device may determine if the transmit power parameter satisfies a second criterion, for example, as described herein with respect to FIG. 6. The transmit power parameter may include, for example, an average transmit power over a time window associated with the RF exposure limit, a normalized RF exposure associated with one or more radios of the wireless device, an RF exposure margin above a reserve associated with the RF exposure limit, an RF exposure usage relative to the reserve, a ratio of uplink slots to downlink slots configured for TDD communications, a state associated with DRX, a rate associated with uplink scheduling, a rate associated with downlink scheduling, a size of data stored for transmission, or any combination thereof.

If the transmit power parameter does not satisfy the second criterion, then the operations 700 proceed to block 704, where the wireless device may determine the transmit power for transmission(s) in compliance with an RF exposure limit without using sensing circuitry. Thus, when the transmit power does not satisfy the second criterion, the sensing circuitry may continue to operate in the first mode. For example, the wireless device may be transmitting at a low power where transmit power is below an RF exposure limit regardless of the RF exposure scenario. Operating the sensing circuitry in the first mode may result in reduced power consumption in the wireless device and/or decreased interference from the sensing circuitry.

If the transmit power satisfies the second criterion, then the operations 700 proceed to block 708, where the wireless device may operate the sensing circuitry in a second mode (e.g., the second mode 604). In the second mode, the wireless device may determine transmit power(s) for transmission(s) in compliance with an RF exposure limit determined with the sensing circuitry. Operating the sensing circuitry in a second mode may result in increased power consumption and/or increased interference relative to the first mode.

At block 710, the wireless device may determine transmit power(s) for transmission(s) in compliance with a second transmit power limit associated with the RF exposure limit. The second transmit power limit may be associated with an on-body RF exposure scenario, for example. The wireless device may determine that the DSI indicates an on-body scenario, and the wireless device may use the transmit power limit corresponding to such an RF exposure scenario.

At block 712, the wireless device may determine whether the wireless device is on or off the body of the user with the sensing circuitry (e.g., the on-off body sensor 518). The sensing circuitry may obtain one or more measurements (e.g., acceleration(s)) indicative of whether the wireless device is positioned next to human tissue. If the wireless device is detected as being on the body of the user, then the operations 700 may continue to use the second transmit power limit for RF exposure compliance at block 710.

If the wireless device is determined not to be on the body of the user (e.g., the wireless device is positioned off the body of the user), then the operations 700 may proceed to block 714, where the wireless device may determine whether there is an object in proximity to the user (e.g., in a certain range of the user). The sensing circuitry (e.g., the proximity sensor 520) may obtain one or more measurements (e.g., reflections from radar pulses) indicative of whether human tissue is proximate to the wireless device. In certain aspects, the wireless device may refrain from using the proximity sensor to evaluate the RF exposure scenario until the wireless device is determined not be on the body of the user. In such cases, selectively using the proximity sensor may further reduce the power consumption and/or interference due to evaluating the RF exposure scenario.

If there is no object proximate to the wireless device based on the measurements, then the operations 700 may proceed to block 716, where the wireless device may use a third transmit power limit for RF exposure compliance, for example, as further described herein with respect to FIG. 8. The third transmit power limit may be associated with a scenario where the wireless device is considered to be off the body of the user, and where human tissue or an object is located outside a certain range to not be considered proximate to the wireless device. For example, the wireless device may determine that the DSI and DRI indicate an off-body scenario without a bystander detected, and the wireless device may use the transmit power limit corresponding to such an RF exposure scenario.

If an object is proximate to the wireless device, then the operations 700 may proceed to block 718, where the wireless device may use a fourth transmit power limit associated with the RF exposure limit for RF exposure compliance, for example, as further described herein with respect to FIG. 8. In some examples, the operations 700 only proceed to block 718 if it is determined that not only is an object present, but the object includes human tissue or is likely associated with a living creature or animate subject. The fourth transmit power limit may be associated with a scenario where the wireless device is considered to be off the body of the user, and where human tissue or an object is located within a certain range to be considered proximate to the wireless device. For example, the wireless device may determine that the DSI and DRI indicate an off-body scenario with a bystander detected, and the wireless device may use the transmit power limit corresponding to such an RF exposure scenario.

At block 720, the wireless device may determine if the transmit power satisfies a first criterion, for example, as described herein with respect to FIG. 6. If the transmit power parameter satisfies the first criterion, then the operations 700 may proceed to block 702, where the wireless device may operate the sensing circuitry in the first mode. If the transmit power parameter does not satisfy the first criterion, then the wireless device may continue to evaluate the RF exposure scenario with the sensing circuitry, for example, at block 712 (or at block 714 in certain aspects).

In certain aspects, the wireless device may evaluate whether the wireless device is on the body of the user in parallel (e.g., concurrently) with the object proximity detection. For example, when the wireless device uses object proximity detection to determine the RF exposure scenario, the wireless device may also read measurements from the on-off body sensor to determine whether the wireless device is on the body. If the wireless device is detected to be on the body of the user, then the wireless device may refrain from using the proximity sensor for evaluating the RF exposure scenario. In some examples, the same sensor is used for both on-off body detection and proximity detection. For example, an antenna may be used to transmit a frequency modulated wave and one or more other antennas may be used to receive reflections of the frequency modulated wave and/or field couplings from the transmission of the frequency modulated wave. In some such configurations, signals present at the one or more other antennas may be processed differently to distinguish between on-off body detection and proximity detection at a farther distance. Thus, in some examples, the sensor 518 and the sensor 520 are the same sensor or share components.

FIG. 8 is a table illustrating example transmit power limits associated with different RF exposure scenarios, in accordance with certain aspects of the present disclosure. In this example, the RF exposure scenarios may be based on a DSI and/or a DRI. In certain aspects, each of the RF exposure scenarios may be associated with a specific transmit power limit (e.g., a time-averaged transmit power limit $P_{limit}$), which is associated an RF exposure limit, which may further depend on the frequency range (e.g., sub-6 GHz and >6 GHz). The RF exposure scenario may be determined by sensing circuitry, as described herein. For example, the DSI may be determined using an on-off body sensor, and the DRI may be determined using a proximity sensor. An RF exposure scenario may refer to a specific use case associated with the wireless device (e.g., on-body, off-body bystander detected, off-body no bystander detected).

As an example, an on-body RF exposure scenario (e.g., DSI=0, DRI=0) may be associated with certain first transmit power limits. In such a scenario, the transmit power limit associated with the RF exposure limit may be set to a first power limit P1 at a first frequency range (sub-6 GHz) or a fourth power limit P4 at a second frequency range (e.g., >6 GHz). The wireless device may be, for example, positioned next to a human head or in the pocket of the user. Referring to FIG. 7, the wireless device may set the first transmit power limit and/or second transmit power limit to the values (e.g., P1, P4) associated with an on-body RF exposure scenario.

In a second example, an off-body RF exposure scenario with a bystander detected (e.g., DSI=1, DRI=0) may be associated with certain second transmit power limits (e.g., second power limit P2 at the first frequency range and fifth power limit P5 at the second frequency range). Referring to FIG. 7, the wireless device may set the second power limit ($P_{limit}$) associated with the RF exposure limit to the values (e.g., P2, P5) associated with the off-body RF exposure scenario and a bystander detected.

In a third example, an off-body RF exposure scenario without a bystander detected may be associated with certain third transmit power limits (e.g., third power limit P3 at the first frequency range and sixth power limit P6 at the second frequency range). A hotspot exposure scenario may be an example of the off-body RF exposure scenario without a bystander detected. In certain cases, the third transmit power limit(s) may allow for the highest transmit power relative to the other transmit power limits associated with the other RF exposure scenarios. The third transmit power limits may enable improved wireless communication performance for the wireless device, such as lower latencies, higher throughput, and/or lower block error rate. Referring to FIG. 7, the wireless device may set the third transmit power limit to the values (e.g., P3, P6) associated with the off-body RF exposure scenario and no bystander detected.

Those of skill in the art will understand that the RF exposure scenarios and corresponding transmit power limits illustrated in FIG. 8 are merely examples. Other RF exposure scenarios and corresponding transmit power limits may be used in addition to or instead of those illustrated.

For example, additional DSI and/or DRI may be distinguished and associated with varying transmit power limits. In some examples, the DSI may indicate not only whether the wireless device is on body, but which part of the body the wireless device is on (e.g., head, body, extremity). In some examples, instead of the DRI being used to indicate whether an object or person is present (e.g., within a predefined range), there are multiple DRI levels which correspond to the object or person being located at different distances from the wireless device. In other examples, the DRI does not have defined levels, but rather is continuously variable (and corresponds to a variable transmit power limit) across a detectable range.

FIG. 9 is a flow diagram illustrating example operations 900 for wireless communication, in accordance with certain aspects of the present disclosure. The operations 900 may be performed, for example, by a wireless device (e.g., the UE 120a in the wireless communication network 100 or the wireless device 500). The operations 900 may be implemented as software components that are executed and run on one or more processors (e.g., controller/processor 280 of FIG. 2). Further, the transmission and/or reception of signals by the wireless device in the operations 900 may be enabled, for example, by one or more antennas (e.g., antennas 252 of FIG. 2). In certain aspects, the transmission and/or reception of signals by the wireless device may be implemented via a bus interface of one or more processors (e.g., controller/processor 280) obtaining and/or outputting signals.

The operations 900 may optionally begin, at block 902, where the wireless device may switch sensing circuitry (e.g., the sensing circuitry 516) to a first mode (e.g., the first mode 602) in response to one or more first criteria being satisfied, for example, as described herein with respect to FIGS. 5-8. While in the first mode, the wireless device may refrain from evaluating an RF exposure scenario with the sensing circuitry. For certain aspects, the first mode may enable the wireless device to consume less power and/or generate less interference, for example, due to the operations of the sensing circuitry. While the sensing circuitry is in the first mode, the wireless device may refrain from obtaining measurements from the sensing circuitry to evaluate compliance with the RF exposure limit. In certain aspects, the wireless device may disable or leave disabled at least one sensor (e.g., the proximity sensor 520) of the sensing circuitry while the sensing circuitry is in the first mode. The idle mode may include a power saving mode and/or a low interference mode. The first criteria may be satisfied when a transmit power parameter of the wireless device satisfies the first criteria, for example, as described herein with respect to FIG. 6. As an example, the first criteria may be satisfied when the average transmit power is less than a first threshold. In certain aspects, the wireless device may transition from a second mode to the first mode in response to the transmit power parameter of the wireless device satisfying the first criteria, as described herein with respect to FIG. 6.

At block 904, the wireless device may switch the sensing circuitry to a second mode (e.g., the second mode 604) in response to one or more second criteria being satisfied, for example, as described herein with respect to FIGS. 5-8. While in the second mode, the wireless device may evaluate the RF exposure scenario with the sensing circuitry, for example, as described herein with respect to FIG. 7. In certain aspects, the wireless device may obtain the one or more measurements from the sensing circuitry to evaluate compliance with the RF exposure limit while the sensing circuitry is in the second mode. In the second mode, the wireless device may be allowed to transmit at a higher transmit power (compared to the first mode), for example, if the sensing circuitry detects that the wireless device is in a certain RF exposure scenario that allows an increased transmit power associated with the RF exposure limit (e.g., a hotspot RF exposure scenario). The higher transmit power allowed in the second mode may facilitate improved wireless communication performance. The second criteria may be satisfied when a transmit power parameter of the wireless device satisfies the second criteria, for example, as described herein with respect to FIG. 6. As an example, the second criterion may be satisfied when the average transmit power is greater than a second threshold. In certain aspects, the wireless device may transition from the first mode to the second mode in response to the transmit power parameter of the wireless device satisfying the second criteria, as described herein with respect to FIG. 6.

At block 906, the wireless device may transmit a signal at a transmit power determined based at least in part on a RF exposure limit, and if the sensing circuitry is operating in the second mode, on one or more measurements associated with the sensing circuitry, for example, as described herein with respect to FIGS. 5-8. The measurements may indicate the RF exposure scenario (e.g., device use case) exhibited by the wireless device, and a transmit power limit associated with the RF exposure limit may depend on the RF exposure scenario. The measurements may indicate whether the wireless device is positioned next to human tissue and indicate whether the human tissue or an object is proximate to the wireless device, for example, as described herein with respect to FIGS. 6 and 7.

For certain aspects, the RF exposure limit may be a time-averaged RF exposure limit across a moving time window, for example, as described herein with respect to FIGS. 4A and 4B. The transmit power may be associated with a time interval within the moving time window, and the remaining portion of the moving time window is associated with past transmissions. For example, the wireless device may determine the transmit power such that the transmit power satisfies the RF exposure limit in terms of a time-averaged RF exposure limit.

In certain aspects, the wireless device may set a time-averaged power limit (e.g., $P_{limit}$) associated with the RF exposure limit in response to the sensing circuitry being switched to the first mode. For example, the wireless device may use a default time-averaged power limit associated with the RF exposure limit while in the first mode. The wireless device may consider the wireless device to be in a particular RF exposure scenario (e.g., DSI=0, DRI=0) while in the first mode, and thus, the wireless device may use the transmit power limit(s) associated with the particular RF exposure scenario to determine the transmit power.

For certain aspects, the wireless device may adjust the transmit power limit associated with the RF exposure limit based on the measurements associated with the sensing circuitry while the sensing circuitry is in the second mode. For example, the wireless device may use the measurements associated with the sensing circuitry to evaluate the RF exposure scenario and determine an exposure transmit power limit associated with the RF exposure scenario, while in the second mode. In certain aspects, the wireless device may identify an RF exposure scenario among a plurality of RF exposure scenarios based on the measurements associated with the sensing circuitry, and to adjust the transmit power limit, the wireless device may adjust the transmit power limit based on the identified RF exposure scenario.

For certain aspects, the RF exposure scenario may correspond to at least a device state index, a device range index, or a combination thereof, for example, as described herein with respect to FIG. 8. The RF exposure scenario may also correspond to one or more transmit power limits and/or one or more RF exposure limits, which may depend on the frequency of the transmission.

For certain aspects, the one or more threshold values associated with the one or more first criteria may be different from one or more threshold values associated with the one or more second criteria, for example, as described herein with respect to FIG. 6.

In certain aspects, the one or more first criteria or the one or more second criteria may be an average transmit power over a time window associated with the RF exposure limit, a normalized RF exposure associated with one or more radios, an RF exposure margin above a reserve associated with the RF exposure limit, an RF exposure usage relative to the reserve, a ratio of uplink slots to downlink slots configured for TDD communications, a state associated with DRX, a rate associated with uplink scheduling, a rate associated with downlink scheduling, a size of data stored for transmission, or any combination thereof, for example, as described herein with respect to FIG. 6.

For certain aspects, the one or more first criteria may be satisfied when the average transmit power is less than or equal to a first threshold, the normalized RF exposure is less than or equal to a second threshold, the RF exposure margin above the reserve is greater than or equal to a third threshold, the ratio of uplink slots to downlink slots is less than or equal to a fourth threshold, DRX is enabled, the rate associated with uplink scheduling is less than or equal to a fifth threshold, the rate associated with downlink scheduling is greater than or equal to a sixth threshold, the size of the data stored is less than or equal to a seventh threshold, or any combination thereof, for example, as described herein with respect to FIG. 6.

In certain aspects, the one or more second criteria may be satisfied when the average transmit power is greater than or equal to a first threshold, the normalized RF exposure is greater than or equal to a second threshold, the RF exposure margin above the reserve is less than or equal to a third threshold, the ratio of uplink slots to downlink slots is greater than or equal to a fourth threshold, DRX is disabled, the rate associated with uplink scheduling is greater than or equal to a fifth threshold, the rate associated with downlink scheduling is less than or equal to a sixth threshold, the size of the data stored is greater than or equal to a seventh threshold, or any combination thereof, for example, as described herein with respect to FIG. 6.

FIG. 10 is a flow diagram illustrating example operations 1000 for wireless communication, in accordance with certain aspects of the present disclosure. The operations 1000 may be performed, for example, by a wireless device (e.g., the UE 120a in the wireless communication network 100 or the wireless device 500). The operations 1000 may be implemented as software components that are executed and run on one or more processors (e.g., controller/processor 280 of FIG. 2). Further, the transmission and/or reception of signals by the wireless device in the operations 1000 may be enabled, for example, by one or more antennas (e.g., antennas 252 of FIG. 2). In certain aspects, the transmission and/or reception of signals by the wireless device may be implemented via a bus interface of one or more processors (e.g., controller/processor 280) obtaining and/or outputting signals.

The operations 1000 may optionally begin, at block 1002, where the wireless device may determine a transmit power parameter, for example, as described herein with respect to FIG. 6. The transmit power parameter may include any of the metrics described herein with respect to FIG. 6. For example, the transmit power may include an average transmit power, a normalized RF exposure, an uplink/sidelink buffer size, or any combination thereof.

At block 1004, if the transmit power parameter is less than or equal to a first threshold, then the wireless device may disable or leave disabled one or more sensors (e.g., the on-off body sensor 518 and/or the proximity sensor 520) associated with RF exposure, for example, as described herein with respect to FIGS. 5-8. The sensors may be used to evaluate an RF exposure scenario, where a transmit power limit associated with an RF exposure limit may be associated with the RF exposure scenario, for example, as described herein with respect to FIG. 8. For example, the wireless device may transition from operating in a second mode to operating in a first mode in response to identifying that the transmit power parameter satisfies a first criterion (e.g., identifying that the transmit power parameter is less than or equal to the first threshold), as described herein with respect to FIG. 6.

At block 1006, if the transmit power parameter is greater than or equal to a second threshold, then the wireless device may enable or leave enabled the one or more sensors associated with the RF exposure, for example, as described herein with respect to FIGS. 5-8. For example, the wireless device may transition from operating in a first mode to operating in a second mode in response to identifying that the transmit power parameter satisfies a second criterion (e.g., identifying that the transmit power parameter is greater than or equal to the second threshold), as described herein with respect to FIG. 6. In certain aspects, the first threshold may equal the second threshold or be different from the second threshold, for example, as described herein with respect to FIG. 6.

At block 1008, the wireless device may transmit a signal at a transmit power determined based at least in part on an RF exposure limit, and if the one or more sensors associated with RF exposure are enabled, on one or more measurements from the one or more sensors associated with RF exposure, for example, as described herein with respect to FIGS. 5-8.

While the examples depicted in FIGS. 1-11 are described herein with respect to a UE performing the various methods for providing RF exposure compliance to facilitate understanding, aspects of the present disclosure may also be applied to other wireless devices, such as a wireless station, an access point, a base station, and/or a CPE, performing the RF exposure compliance described herein. Further, while the examples are described with respect to communication between the UE (or other wireless device) and a network entity, the UE (or other wireless device) may be communicating with a device other than a network entity, for example another UE or with another device in a user's home that is not a network entity, for example.

It will be appreciated that the modes for sensing circuitry described herein may enable reduced interference and/or desirable wireless communication performance, such as reduced latencies, increased uplink data rates, and/or an uplink connection at the edge of a cell.

Example Communications Device

Figure 11:
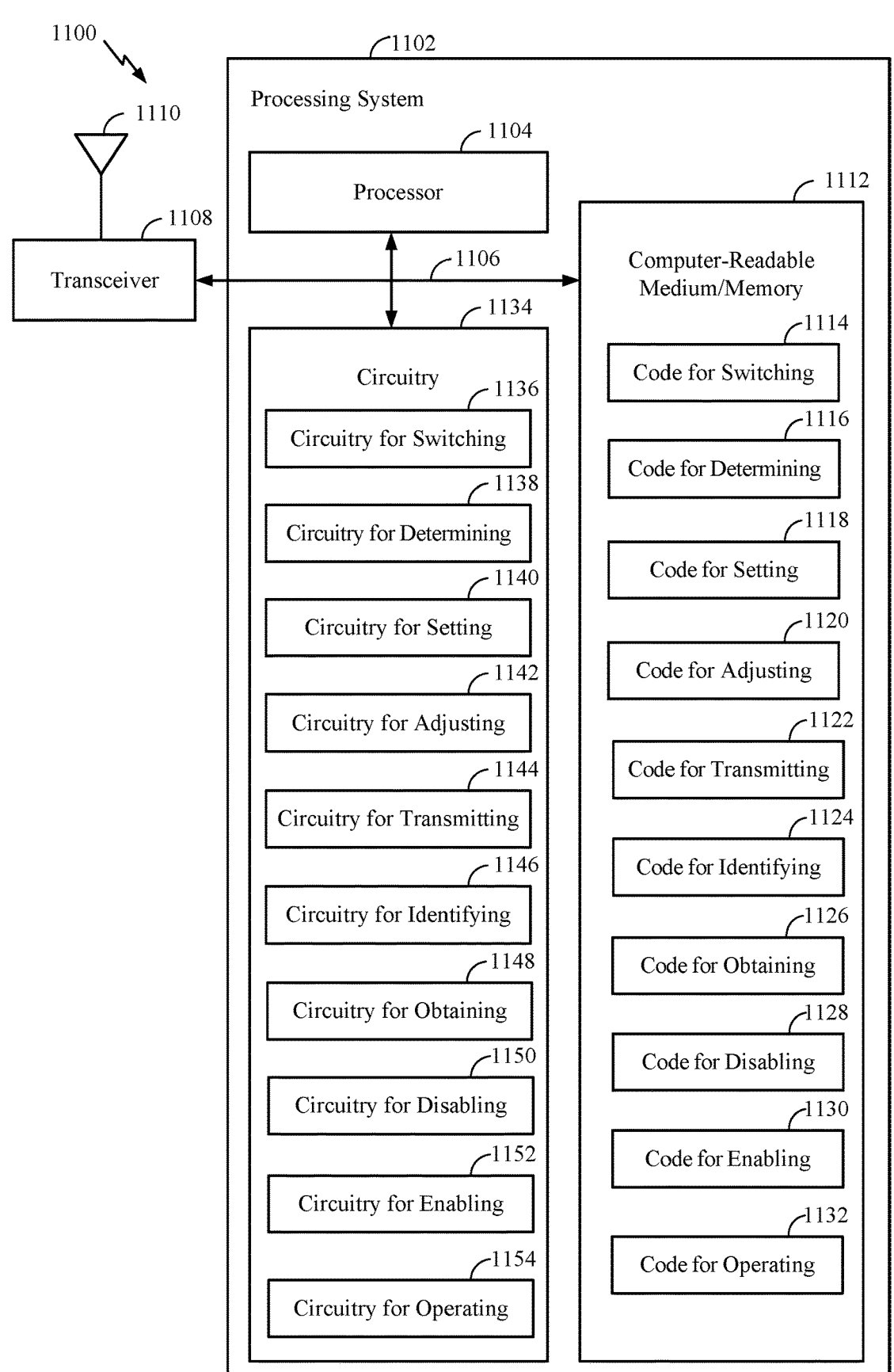
FIG. 11 illustrates a communications device that may include various components configured to perform operations for the techniques disclosed herein, in accordance with certain aspects of the present disclosure.

FIG. 11 illustrates a communications device 1100 (e.g., the UE 120) that may include various components (e.g., corresponding to means-plus-function components) configured to perform operations for the techniques disclosed herein, such as the operations illustrated in FIGS. 9 and 10. The communications device 1100 includes a processing system 1102, which may be coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the communications device 1100 to perform the operations 900 and 1000 illustrated in FIGS. 9 and 10, or other operations for performing the various techniques discussed herein for providing RF exposure compliance. In certain aspects, computer-readable medium/memory 1112 stores code for switching 1114, code for determining 1116, code for setting 1118, code for adjusting 1120, code for transmitting (or providing) 1122, code for identifying 1124, code for obtaining 1126, code for disabling 1128, code for enabling 1130, code for operating 1132, or any combination thereof.

In certain aspects, the processing system 1102 has circuitry 1134 configured to implement the code stored in the computer-readable medium/memory 1112. In certain aspects, the circuitry 1134 is coupled to the processor 1104 and/or the computer-readable medium/memory 1112 via the bus 1106.

For example, the circuitry 1134 includes circuitry for switching 1136, circuitry for determining 1138, circuitry for setting 1140, circuitry for adjusting 1142, circuitry for transmitting (or providing) 1144, circuitry for identifying 1146, circuitry for obtaining 1148, circuitry for disabling 1150, circuitry for enabling 1152, circuitry for operating 1154, or any combination thereof.

In some examples, means for transmitting or sending (or means for outputting for transmission) may include the transceivers 232 and/or antenna(s) 234 of the BS 102 illustrated in FIG. 2 and/or transceiver 1108 and antenna 1110 of the communication device 1100 in FIG. 11.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for switching, means for determining, means for setting, means for adjusting, means for identifying, means for obtaining, means for disabling, and/or means for operating may include various processing system components, such as: the one or more processors 1104 in FIG. 11, or aspects of the BS 102 depicted in FIG. 2, including receive processor 238, transmit processor 220, TX MIMO processor 230, and/or controller/processor 240.

Example Aspects

Implementation examples are described in the following numbered clauses:

Aspect 1: A method of wireless communication by a wireless device, comprising: switching sensing circuitry to a first mode in response to one or more first criteria being satisfied; switching the sensing circuitry to a second mode in response to one or more second criteria being satisfied; and transmitting a signal at a transmit power determined based at least in part on a radio frequency (RF) exposure limit, and if the sensing circuitry is operating in the second mode, on one or more measurements associated with the sensing circuitry.

Aspect 2: The method of Aspect 1, further comprising determining the transmit power such that the transmit power satisfies the RF exposure limit in terms of a time-averaged RF exposure limit.

Aspect 3: The method of Aspect 1 or 2, further comprising setting a time-averaged transmit power limit associated with the RF exposure limit in response to the sensing circuitry being switched to the first mode.

Aspect 4: The method according to any of Aspects 1-3, further comprising adjusting a time-averaged transmit power limit associated with the RF exposure limit based on the one or more measurements associated with the sensing circuitry while the sensing circuitry is in the second mode.

Aspect 5: The method of Aspect 4, further comprising identifying an RF exposure scenario among a plurality of RF exposure scenarios based on the one or more measurements associated with the sensing circuitry, wherein adjusting the time-averaged transmit power limit comprises adjusting the time-averaged transmit power limit based on the identified RF exposure scenario.

Aspect 6: The method of Aspect 5, wherein the RF exposure scenario corresponds to at least a device state index.

Aspect 7: The method of Aspect 5 or 6, wherein the one or more measurements indicate whether the wireless device is positioned next to human tissue and indicate whether the human tissue is proximate to the wireless device.

Aspect 8: The method according to any of Aspects 1-7, further comprising refraining from obtaining the one or more measurements from the sensing circuitry to evaluate compliance with the RF exposure limit while the sensing circuitry is in the first mode.

Aspect 9: The method according to any of Aspects 1-8, further comprising disabling or leaving disabled at least one sensor of the sensing circuitry while the sensing circuitry is in the first mode.

Aspect 10: The method according to any of Aspects 1-9, further comprising operating the sensing circuitry in an idle mode while the sensing circuitry is in the first mode.

Aspect 11: The method of Aspect 10, wherein the idle mode includes a power saving mode.

Aspect 12: The method according to any of Aspects 1-11, further comprising obtaining the one or more measurements from the sensing circuitry to evaluate compliance with the RF exposure limit while the sensing circuitry is in the second mode.

Aspect 13: The method according to any of Aspects 1-12, wherein one or more threshold values associated with the one or more first criteria are different from one or more threshold values associated with the one or more second criteria.

Aspect 14: The method according to any of Aspects 1-13, wherein the one or more first criteria or the one or more second criteria comprise: an average transmit power over a time window associated with the RF exposure limit; a normalized RF exposure associated with one or more radios; an RF exposure margin above a reserve associated with the RF exposure limit; an RF exposure usage relative to the reserve; a ratio of uplink slots to downlink slots configured for time division duplex (TDD) communications; a state associated with discontinuous reception (DRX); a rate associated with uplink scheduling; a rate associated with downlink scheduling; a size of data stored for transmission; or any combination thereof.

Aspect 15: The method of Aspect 14, wherein the one or more first criteria is satisfied when: the average transmit power is less than or equal to a first threshold; the normalized RF exposure is less than or equal to a second threshold; the RF exposure margin above the reserve is greater than or equal to a third threshold; the ratio of uplink slots to downlink slots is less than or equal to a fourth threshold; DRX is enabled; the rate associated with uplink scheduling is less than or equal to a fifth threshold; the rate associated with downlink scheduling is greater than or equal to a sixth threshold; the size of the data stored is less than or equal to a seventh threshold; or any combination thereof.

Aspect 16: The method of Aspect 14 or 15, wherein the one or more second criteria is satisfied when: the average transmit power is greater than or equal to a first threshold; the normalized RF exposure is greater than or equal to a second threshold; the RF exposure margin above the reserve is less than or equal to a third threshold; the ratio of uplink slots to downlink slots is greater than or equal to a fourth threshold; DRX is disabled; the rate associated with uplink scheduling is greater than or equal to a fifth threshold; the rate associated with downlink scheduling is less than or equal to a sixth threshold; the size of the data stored is greater than or equal to a seventh threshold; or any combination thereof.

Aspect 17: A method of wireless communication by a wireless device, comprising: determining a transmit power parameter; if the transmit power parameter is less than a first threshold, then disabling or leaving disabled one or more sensors associated with radio frequency (RF) exposure; if the transmit power parameter is greater than a second threshold, then enabling or leaving enabled the one or more sensors associated with RF exposure; and transmitting a signal at a transmit power determined based at least in part on an RF exposure limit, and if the one or more sensors associated with RF exposure are enabled, on one or more measurements from the one or more sensors associated with RF exposure.

Aspect 18: The method of Aspect 17, wherein the second threshold equals the first threshold.

Aspect 19: An apparatus for wireless communication, comprising: one or more memories collectively storing computer-executable instructions; and one or more processors coupled to the one or more memories, the one or more processors being collectively configured to execute the computer-executable instructions to cause the apparatus to perform an operation comprising:

switching sensing circuitry to a first mode in response to one or more first criteria being satisfied; switching the sensing circuitry to a second mode in response to one or more second criteria being satisfied; and transmitting a signal at a transmit power determined based at least in part on a radio frequency (RF) exposure limit, and if the sensing circuitry is operating in the second mode, on one or more measurements associated with the sensing circuitry.

Aspect 20: An apparatus for wireless communication, comprising: one or more memories collectively storing computer-executable instructions; and one or more processors coupled to the one or more memories, the one or more processors being collectively configured to execute the computer-executable instructions to cause the apparatus to perform an operation comprising: determining a transmit power parameter; if the transmit power parameter is less than a first threshold, then disabling or leaving disabled one or more sensors associated with radio frequency (RF) exposure; if the transmit power parameter is greater than a second threshold, then enabling or leaving enabled the one or more sensors associated with RF exposure; and transmitting a signal at a transmit power determined based at least in part on an RF exposure limit, and if the one or more sensors associated with RF exposure are enabled, on one or more measurements from the one or more sensors associated with RF exposure.

Aspect 21: An apparatus for wireless communication, comprising: means for switching sensing circuitry to a first mode in response to one or more first criteria being satisfied; means for switching the sensing circuitry to a second mode in response to one or more second criteria being satisfied; and means for transmitting a signal at a transmit power determined based at least in part on a radio frequency (RF) exposure limit, and if the sensing circuitry is operating in the second mode, on one or more measurements associated with the sensing circuitry.

Aspect 22: An apparatus for wireless communication, comprising: means for determining a transmit power parameter; means for disabling or leaving disabled, if the transmit power parameter is less than a first threshold, one or more sensors associated with radio frequency (RF) exposure; means for enabling or leaving enabled, if the transmit power parameter is greater than a second threshold, the one or more sensors associated with RF exposure; and means for transmitting a signal at a transmit power determined based at least in part on an RF exposure limit, and if the one or more sensors associated with RF exposure are enabled, on one or more measurements from the one or more sensors associated with RF exposure.

Aspect 23: A computer-readable medium having instructions stored thereon for: switching sensing circuitry to a first mode in response to one or more first criteria being satisfied; switching the sensing circuitry to a second mode in response to one or more second criteria being satisfied; and transmitting a signal at a transmit power determined based at least in part on a radio frequency (RF) exposure limit, and if the sensing circuitry is operating in the second mode, on one or more measurements associated with the sensing circuitry.

Aspect 24: A computer-readable medium having instructions stored thereon for: determining a transmit power parameter; if the transmit power parameter is less than a first threshold, then disabling or leaving disabled one or more sensors associated with radio frequency (RF) exposure; if the transmit power parameter is greater than a second threshold, then enabling or leaving enabled the one or more sensors associated with RF exposure; and transmitting a signal at a transmit power determined based at least in part on an RF exposure limit, and if the one or more sensors associated with RF exposure are enabled, on one or more measurements from the one or more sensors associated with RF exposure.

Aspect 25: An apparatus, comprising: one or more memories collectively storing computer-executable instructions; one or more processors coupled to the one or more memories and collectively configured to execute the computer-executable instructions to cause the apparatus to perform a method in accordance with any of Aspects 1-18.

Aspect 26: An apparatus, comprising means for performing a method in accordance with any of Aspects 1-18.

Aspect 27: A non-transitory computer-readable medium comprising computer-executable instructions that, when collectively executed by one or more processors of a processing system, cause the processing system to perform a method in accordance with any of Aspects 1-18.

Aspect 28: A computer program product embodied on a computer-readable storage medium comprising code for performing a method in accordance with any of Aspects 1-18.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95, and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE and a customer premises equipment (CPE) may also be referred to as a mobile station, a terminal, an access terminal, a subscriber unit, a station, a cellular phone, a smart phone, a personal digital assistant (PDA), a wireless modem, a wireless device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, "a processor," "at least one processor," or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memories" generally refers to a single memory configured to store data and/or instructions or multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, generating, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a UE (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 9 and 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, or a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of wireless communication by a wireless device, comprising:

switching sensing circuitry to a first mode in response to one or more first criteria being satisfied;

switching the sensing circuitry to a second mode in response to one or more second criteria being satisfied; and transmitting a signal at a transmit power determined based at least in part on a radio frequency (RF) exposure limit, and if the sensing circuitry is operating in the second mode, on one or more measurements associated with the sensing circuitry.

2. The method of claim 1, further comprising determining the transmit power such that the transmit power satisfies the RF exposure limit in terms of a time-averaged RF exposure limit.

3. The method of claim 1, further comprising setting a time-averaged transmit power limit associated with the RF exposure limit in response to the sensing circuitry being switched to the first mode.

4. The method of claim 1, further comprising adjusting a time-averaged transmit power limit associated with the RF exposure limit based on the one or more measurements associated with the sensing circuitry while the sensing circuitry is in the second mode.

5. The method of claim 4, further comprising identifying an RF exposure scenario among a plurality of RF exposure scenarios based on the one or more measurements associated with the sensing circuitry, wherein adjusting the time-averaged transmit power limit comprises adjusting the time-averaged transmit power limit based on the identified RF exposure scenario.

6. The method of claim 5, wherein the RF exposure scenario corresponds to at least a device state index.

7. The method of claim 5, wherein the one or more measurements indicate whether the wireless device is positioned next to human tissue and indicate whether the human tissue is proximate to the wireless device.

8. The method of claim 1, further comprising refraining from obtaining the one or more measurements from the sensing circuitry to evaluate compliance with the RF exposure limit while the sensing circuitry is in the first mode.

9. The method of claim 1, further comprising disabling or leaving disabled at least one sensor of the sensing circuitry while the sensing circuitry is in the first mode.

10. The method of claim 1, further comprising operating the sensing circuitry in an idle mode while the sensing circuitry is in the first mode.

11. The method of claim 10, wherein the idle mode includes a power saving mode.

12. The method of claim 1, further comprising obtaining the one or more measurements from the sensing circuitry to evaluate compliance with the RF exposure limit while the sensing circuitry is in the second mode.

13. The method of claim 1, wherein one or more threshold values associated with the one or more first criteria are different from one or more threshold values associated with the one or more second criteria.

14. The method of claim 1, wherein the one or more first criteria or the one or more second criteria comprise:

an average transmit power over a time window associated with the RF exposure limit;

a normalized RF exposure associated with one or more radios;

an RF exposure margin above a reserve associated with the RF exposure limit;

an RF exposure usage relative to the reserve;

a ratio of uplink slots to downlink slots configured for time division duplex (TDD) communications;

a state associated with discontinuous reception (DRX);

a rate associated with uplink scheduling;

a rate associated with downlink scheduling;

a size of data stored for transmission; or any combination thereof.

15. The method of claim 14, wherein the one or more first criteria is satisfied when:

the average transmit power is less than or equal to a first threshold;

the normalized RF exposure is less than or equal to a second threshold;

the RF exposure margin above the reserve is greater than or equal to a third threshold;

the ratio of uplink slots to downlink slots is less than or equal to a fourth threshold;

DRX is enabled;

the rate associated with uplink scheduling is less than or equal to a fifth threshold;

the rate associated with downlink scheduling is greater than or equal to a sixth threshold;

the size of the data stored is less than or equal to a seventh threshold; or any combination thereof.

16. The method of claim 14, wherein the one or more second criteria is satisfied when:

the average transmit power is greater than or equal to a first threshold;

the normalized RF exposure is greater than or equal to a second threshold;

the RF exposure margin above the reserve is less than or equal to a third threshold;

the ratio of uplink slots to downlink slots is greater than or equal to a fourth threshold;

DRX is disabled;

the rate associated with uplink scheduling is greater than or equal to a fifth threshold;

the rate associated with downlink scheduling is less than or equal to a sixth threshold;

the size of the data stored is greater than or equal to a seventh threshold; or any combination thereof.

17. A method of wireless communication by a wireless device, comprising:

determining a transmit power parameter;

if the transmit power parameter is less than a first threshold, then disabling or leaving disabled one or more sensors associated with radio frequency (RF) exposure;

if the transmit power parameter is greater than a second threshold, then enabling or leaving enabled the one or more sensors associated with RF exposure; and transmitting a signal at a transmit power determined based at least in part on an RF exposure limit, and if the one or more sensors associated with RF exposure are enabled, on one or more measurements from the one or more sensors associated with RF exposure.

18. The method of claim 17, wherein the second threshold equals the first threshold.

19. An apparatus for wireless communication, comprising:
  one or more memories collectively storing computer-executable instructions; and
  one or more processors coupled to the one or more memories, the one or more processors being collectively configured to execute the computer-executable instructions to cause the apparatus to perform an operation comprising:
  switching sensing circuitry to a first mode in response to one or more first criteria being satisfied;
  switching the sensing circuitry to a second mode in response to one or more second criteria being satisfied; and
  transmitting a signal at a transmit power determined based at least in part on a radio frequency (RF) exposure limit, and if the sensing circuitry is operating in the second mode, on one or more measurements associated with the sensing circuitry.

20. The apparatus of claim 19, the operation further comprising determining the transmit power such that the transmit power satisfies the RF exposure limit in terms of a time-averaged RF exposure limit.

21. The apparatus of claim 19, the operation further comprising setting a time-averaged transmit power limit associated with the RF exposure limit in response to the sensing circuitry being switched to the first mode.

22. The apparatus of claim 19, the operation further comprising adjusting a time-averaged transmit power limit associated with the RF exposure limit based on the one or more measurements associated with the sensing circuitry while the sensing circuitry is in the second mode.

23. The apparatus of claim 22, the operation further comprising identifying an RF exposure scenario among a plurality of RF exposure scenarios based on the one or more measurements associated with the sensing circuitry, wherein adjusting the time-averaged transmit power limit comprises adjusting the time-averaged transmit power limit based on the identified RF exposure scenario.

24. The apparatus of claim 19, the operation further comprising refraining from obtaining the one or more measurements from the sensing circuitry to evaluate compliance with the RF exposure limit while the sensing circuitry is in the first mode.

25. The apparatus of claim 19, the operation further comprising disabling or leaving disabled at least one sensor of the sensing circuitry while the sensing circuitry is in the first mode.

26. The apparatus of claim 19, the operation further comprising operating the sensing circuitry in an idle mode while the sensing circuitry is in the first mode.

27. The apparatus of claim 26, wherein the idle mode includes a power saving mode.

28. The apparatus of claim 19, the operation further comprising obtaining the one or more measurements from the sensing circuitry to evaluate compliance with the RF exposure limit while the sensing circuitry is in the second mode.

29. An apparatus for wireless communication, comprising:
  one or more memories collectively storing computer-executable instructions; and
  one or more processors coupled to the one or more memories, the one or more processors being collectively configured to execute the computer-executable instructions to cause the apparatus to perform an operation comprising:
  determining a transmit power parameter;
  if the transmit power parameter is less than a first threshold, then disabling or leaving disabled one or more sensors associated with radio frequency (RF) exposure;
  if the transmit power parameter is greater than a second threshold, then enabling or leaving enabled the one or more sensors associated with RF exposure; and
  transmitting a signal at a transmit power determined based at least in part on an RF exposure limit, and if the one or more sensors associated with RF exposure are enabled, on one or more measurements from the one or more sensors associated with RF exposure.

30. The apparatus of claim 29, wherein the second threshold equals the first threshold.

* * * * *